(12) United States Patent
Iwano et al.

(10) Patent No.: US 6,913,394 B2
(45) Date of Patent: Jul. 5, 2005

(54) OPTICAL CONNECTOR PLUG, MANUFACTURING METHOD THEREOF AND ASSEMBLING TOOL

(75) Inventors: Shinichi Iwano, Tokyo (JP); Shin Sumida, Tokyo (JP); Shuichi Yanagi, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 357 days.

(21) Appl. No.: 09/997,128

(22) Filed: Nov. 29, 2001

(65) Prior Publication Data

US 2002/0090179 A1 Jul. 11, 2002

Related U.S. Application Data

(63) Continuation of application No. PCT/JP00/03561, filed on Jun. 1, 2000.

(30) Foreign Application Priority Data

Jun. 1, 1999 (JP) ............................................ 11-153922

(51) Int. Cl.$^7$ .................................................. G02B 6/36
(52) U.S. Cl. ............................... 385/78; 385/86; 385/60
(58) Field of Search .............................. 385/78, 89, 86, 385/60

(56) References Cited

U.S. PATENT DOCUMENTS

| | | | | |
|---|---|---|---|---|
| 4,773,725 A | * | 9/1988 | Ashman et al. | 385/87 |
| 4,834,487 A | * | 5/1989 | Abendschein et al. | 385/78 |
| 5,142,601 A | * | 8/1992 | Shibata et al. | 385/86 |
| 5,210,810 A | * | 5/1993 | Darden et al. | 385/78 |
| 5,381,500 A | * | 1/1995 | Edwards et al. | 385/78 |
| 5,394,497 A | * | 2/1995 | Erdman et al. | 385/78 |
| 5,396,572 A | * | 3/1995 | Bradley et al. | 385/78 |

FOREIGN PATENT DOCUMENTS

| | | |
|---|---|---|
| EP | 0 819960 A2 | 1/1998 |
| EP | 0 862072 A2 | 9/1998 |
| JP | 63-256909 A | 10/1989 |
| JP | 03-092803 A | 4/1991 |
| JP | 05-323149 A | 12/1993 |
| JP | 10-319273 A | 12/1998 |

* cited by examiner

*Primary Examiner*—Ellen E. Kim
(74) *Attorney, Agent, or Firm*—Fitch, Even, Tabin & Flannery

(57) ABSTRACT

An optical connector plug has a front housing 1, a rear housing 2, a ferrule 3, a coil spring 4 and an optical cord fixing member 5, and in addition to the ferrule 3 and the coil spring 4, the optical cord fixing member 5 for fixing a tension resistive member and a cord outer jacket is received and held within an internal through space defined when the front housing 1 and the rear housing 2 are coupled. Also, upon assembling the optical connector plug, assembling of these members 1 to 5 can be realized by movement in an axial direction as much as possible. Accordingly, assembling of the optical connector plug is facilitated and suitable for automatic assembling.

25 Claims, 25 Drawing Sheets

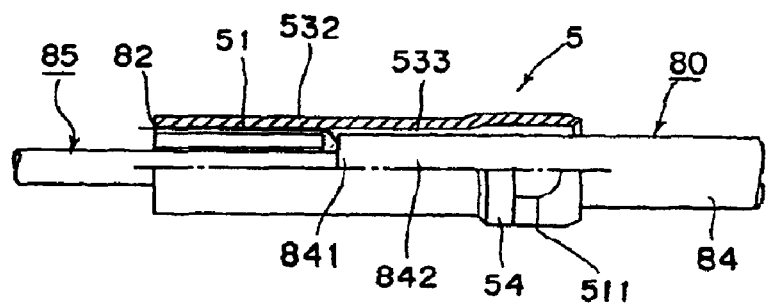
FIG.5A
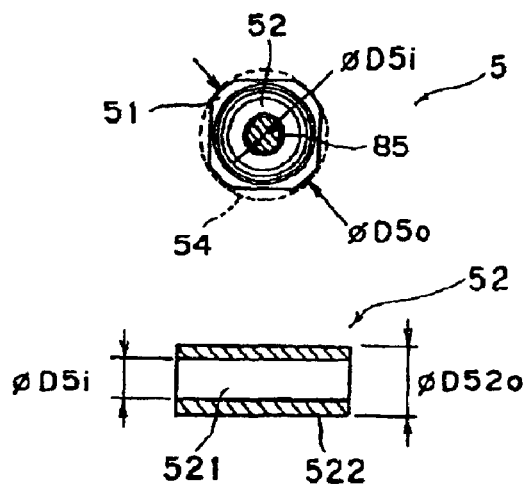
FIG.5B
FIG.5C
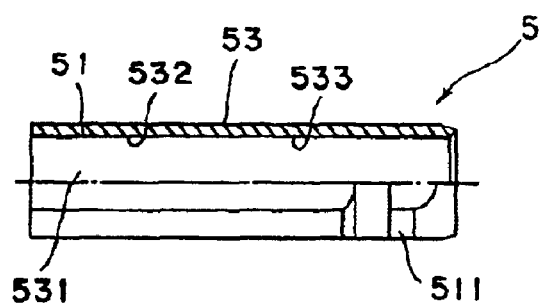
FIG.5D
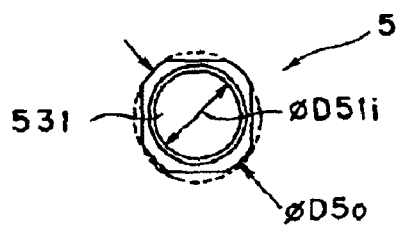
FIG.5E

ENLARGED VIEW OF PORTION A

ENLARGED VIEW OF PORTION B

ENLARGED VIEW OF PORTION C

SECTIONAL VIEW TAKEN ALONG IXD-IXD

SECTIONAL VIEW TAKEN ALONG IXE-IXE

SECTIONAL VIEW TAKEN ALONG IXF-IXF

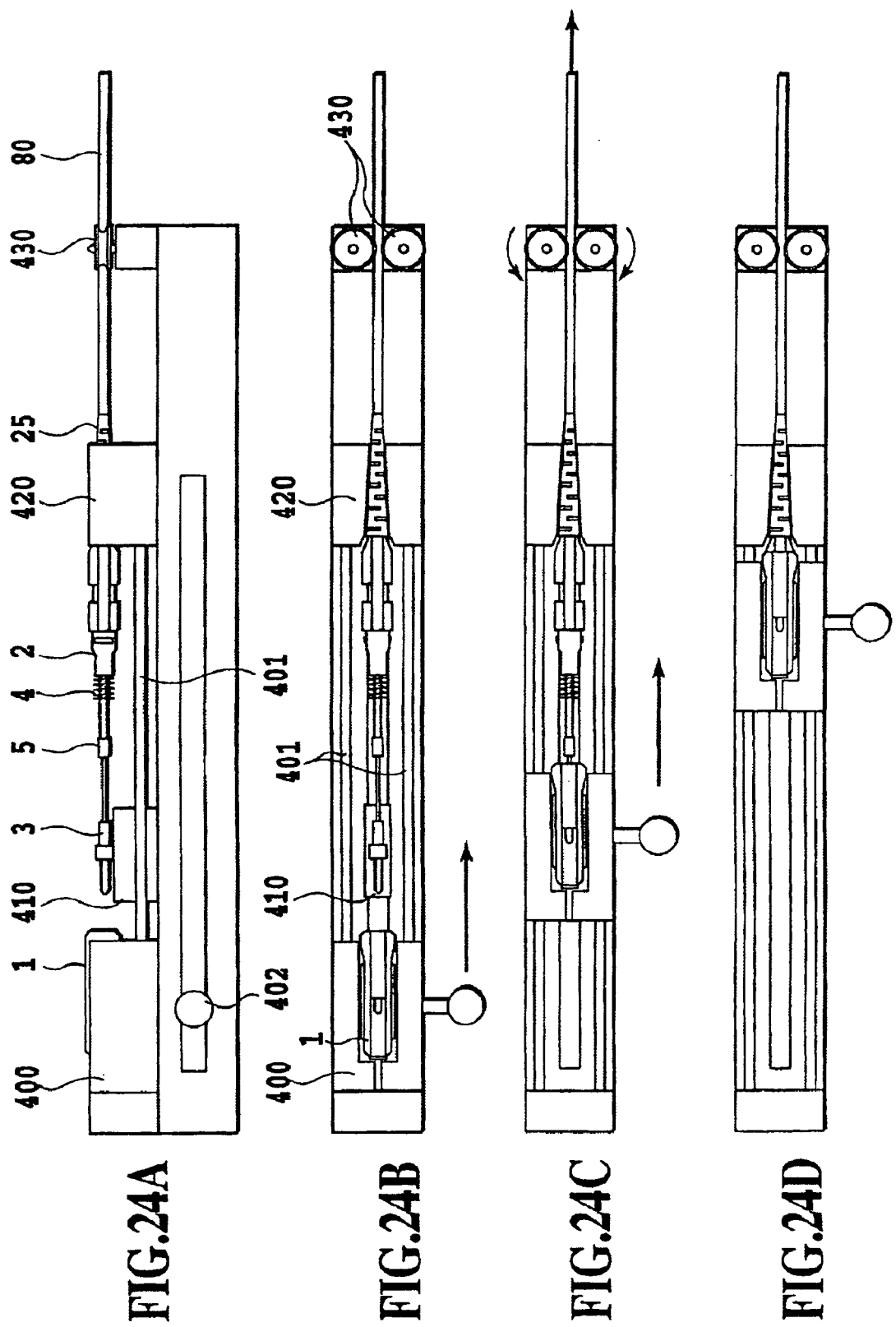

OPTICAL CONNECTOR PLUG, MANUFACTURING METHOD THEREOF AND ASSEMBLING TOOL

This is a continuation of International Patent Application No. PCT/JP00/03561, designating the United States, and having an international filing date of Jun. 1, 2000.

FIELD OF THE INVENTION

The present invention relates to an optical connector plug to be mounted on one end of an optical cord for connecting optical cords incorporating optical fibers, a manufacturing method thereof and an assembling tool thereof.

DESCRIPTION OF THE RELATED ART

FIG. 18 illustrates a structure of a single core type optical cord 80 incorporating a tension resistive member.

The optical cord 80 incorporates a coated optical fiber 85 which is consisted of an optical fiber 81 formed with a core portion at the center and a clad portion and an optical fiber coat (inner coating) 83 coating the optical fiber 81. Further, in the optical cord 80, a cord outer jacket 84 covering the coated optical fiber 85 and a tension resistive member 82 disposed between the coated optical fiber 85 and the cord outer jacket 84 are provided.

As a conventional method for manufacturing the optical cord with a connector plug, in which the optical connector plug is connected to a tip end of the optical cord of this kind, there is "cord connecting method of optical connector (plug)" as reference 2 of JIS C 5973 "F04 type single core optical fiber connector", for example.

In this conventional technique, after mounting the optical fiber 81 on a ferrule, parts are assembled as required. Subsequently, the tension resistive member 82 and the cord outer jacket 84 of the optical cord 80 are fixed. The manufacturing process is illustrated in FIGS. 19A to 19H.

Step 1-1 (FIG. 19A): insert the optical cord 80 into necessary parts (boot 100, cord outer jacket fixing member 101, clamp ring 102, stop ring 103, coil spring 104);

step 1-2 (FIG. 19A): after terminal processing of the optical cord 80, the tension resistive member 82 is temporarily fixed by means of a temporarily fixing means 105, such as a tape or the like;

step 1-3 (FIGS. 19B and 19C): fixing ferrule 106 to the optical fiber 81, and end faces of the optical fiber 81 and the ferrule 106 are polished;

step 1-4 (FIG. 19C): performing pre-assembling of parts (from a front side of the ferrule 106, front housing 107 is moved and from a rear side of the ferrule 106, the coil spring 104 and the stop ring 103 are moved to couple the front housing 107 and the stop ring 103);

step 1-5 (FIGS. 9D and 9E): removing the temporarily fixing means 105, the clamp ring 102 is moved forwardly to fix the tension resistive member 83 by the clamp ring 102 and the stop ring 103, and then the cord outer jacket fixing member 101 is moved frontward to fix the cord outer jacket 84 of the optical cord 80 to the clamp ring 102 and the cord outer jacket fixing member 101 by clamping the cord outer jacket fixing member 101 via the clamp ring 102; and step 1-6 (FIGS. 19F, 19G and 19H): performing post assembling of parts mounting the boot 100 and a finger grip 107 to complete assembling of the connector.

On the other hand, as another example, a construction may be taken to directly fix the tension resistive member 82 and the cord outer jacket 84 to the ferrule 106 for simplification of assembling of the plug. In this case, the process becomes as follow.

Step 2-1: inserting the optical cord into the necessary parts;

step 2-2: terminal processing of the optical cord;

step 2-3: fixing the ferrule to the optical cord;

step 2-4: fixing the tension resistive member and the outer jacket to the ferrule;

step 2-5: assembling the parts (coupling predetermined parts from front and back sides of the ferrule).

However, in the latter construction, since the tension resistive member 82 and the cord outer jacket 84 are directly fixed to the ferrule, if the cord outer jacket 84 is pulled from the back side, for example, an external force can be exerted on the ferrule to cause offset of the position of the ferrule from the predetermined position to potentially cause degradation of an optical characteristics. Particularly, in the case of connection of single mode fibers as used in an optical communication of high speed and large capacity, ferrules of the optical fibers to be connected are tightly fitted with each other so as not to form any gap between end faces of the optical fibers. When the optical cord 80 is pulled, a tension force on the optical cord may act on the ferrule fixing the former to move the ferrule backwardly. As a result, a gap can be formed to cause degradation of connection loss and return loss. Therefore, the latter construction is generally not used for such optical communication of high speed and large capacity.

It should be noted that, in the former construction, the tension resistive member 82 and the cord outer jacket 84 are not fixed to the ferrule 106 but are fixed to other parts, such as the clamp ring 102, the cord outer jacket fixing member 101, the stop ring 103, the front housing 107, and the finger grip 107. Therefore, when the optical cord 80 is pulled, the tension force may act on these parts and can be borne by a stationary portion of the counterpart, such as a casing or the like, to which the connector plug is coupled. Accordingly, the tension force does not directly act on the ferrule 106 so as not to cause degradation connection characteristics due to offset in position of the ferrule 106.

In the former conventional technique, "fixing of the tension resistive member and the cord outer jacket" in step 1-5 becomes later than "fixing of the ferrule to the optical fiber" in step 1-3 and "pre-assembling of the parts" in step 1-4. Steps 1-3 and 1-5 are complicate in comparison with other steps and requires large amount of manual work. On the other hand, step 1-4 is relatively easy to make automated. Considering automatic assembling, it may be efficient and lower cost for assembling work to make steps 1-3 and 1-5 as steps to be performed sequentially. However, in the construction of the conventional optical connector plug, in which the tension resistive member 82 and the cord outer jacket 84 are fixed to the assembling parts, namely the stop ring 103, in step 1-4 via the clamp ring 102 and the cord outer jacket fixing member 101, step 1-4 is necessarily inserted before step 1-5 to make it impossible to perform steps 1-3 and 1-5 sequentially.

On the other hand, in the latter conventional technique, since "fixing the ferrule to the optical cord" in step 2-3 and "fixing the tension resistive member and the outer jacket to the ferrule" in step 2-4 are sequentially performed, this is desirable to make manufacturing efficient. However, as described above, when the optical cord 80 is pulled, an external force is directly exerted on the ferrule resulting in degradation of connecting characteristics, so that there is a deficiency that the latter conventional technique can not be used in a communication device which needs a high reliability.

Further, in conventional, when the cord outer jacket 84 and the tension resistive member 82 are fixed by clamping, it is generally performed in a way that the tension resistive member 82 and the cord outer jacket 84 are placed on the outer peripheral portion of the stop ring or the like and covered by a clamping member, and then fixed. In such a case, a portion of the stop ring or the like for fixing the tension resistive member 82 and the cord outer jacket 84 has to withstand against a clamping force. Therefore, these parts are frequently formed of metal.

On the other hand, as a plug structure for automating or simplification of assembling, there are structures, in which a coil spring is built in the ferrule, or a structure, in which the coil spring and the ferrule are built in a housing. Here, upon fixing the optical fiber to the ferrule, an adhesive is normally used. In the case of the above optical connector with simplified construction, the optical cord or the tension resistive member might be fixed to the housing or the like by adhesive in the condition where the coil spring is built in the ferrule or in the condition where the coil spring and the ferrule are built in the housing. Accordingly, in the case of such simplified plug, careful attention is required so that the adhesive will not adhere on the member other than the ferrule or the member other than those for fixing the tension resistive member. Therefore, in many cases, such application is realized by means of a micro dispenser or a special adhesive application member for applying adhesive. This is because when the adhesive adhere on the parts other than the ferrule or the like, various operation failures can be caused.

SUMMARY OF THE INVENTION

The present invention has been worked out in view of the problems set forth above. It is therefore an object of the present invention to provide an optical connector plug which is simple in construction, may not be degraded characteristics by application of an external force, such as a tension force or the like, is easy in assembling and is adapted for automatic assembling.

Another object of the present invention is to provide a construction, in which parts can be formed at low cost by molding of plastic, and to provide a manufacturing method which facilitates assembling and is suited for automatic operation.

A further object of the present invention is to provide an assembling tool of an optical connector plug that can certainly assemble various parts without causing degradation of optical characteristics and can make assembling operation efficient and economical.

In order to accomplish the above-mentioned objects, an optical connector plug according to the present invention includes a front housing, a rear housing, a ferrule, a coil spring and an optical cord fixing member. In addition to the ferrule and the coil spring, the optical cord fixing member fixing a tension resistive member and a cord outer jacket is housed within an internal through space defined when the front housing and the rear housing are coupled, and is held at respective predetermined positions. On the other hand, upon assembling the optical connector plug using these members, a construction is taken to realize assembling of these members by movement in an axial direction as much as possible.

Namely, an optical connector plug of the present invention in claim 1 is the optical connector plug for connecting an optical cord having an optical fiber, an coated optical fiber having an optical fiber coat covering the optical fiber, a cord outer jacket further covering said coated optical fiber and a tension resistive member disposed between said coated optical fiber and said cord outer jacket, said optical connector plug comprising at least;

a front housing arranged on a front side in an optical axis direction;

a rear housing coupled to said front housing and arranged on a rear side of said front housing in the optical axis direction;

a ferrule;

a coil spring; and an optical cord fixing member;

wherein said ferrule is constructed with at least an optical fiber positioning and fixing portion for fixing and positioning the optical fiber of said optical cord and a flange portion contacting with said coil spring within said front housing and biased by the latter and held;

wherein said coil spring has a tip end portion contacting said flange portion of said ferrule for biasing the latter, and a rear end portion for contacting with said rear housing, said coil spring having predetermined inner and outer diameters;

wherein said optical cord fixing member is a member constructed with one or more members and has a fixing structure of said optical cord depending upon a structure of said optical cord to be used, said optical cord fixing member, at least after the optical cord is assembled and fixed thereto, having a circumscribing circle smaller than a predetermined diameter and an inscribing diameter greater than an outer diameter of said optical cord, and having engaging means for engaging with an inner peripheral surface of said rear housing at least on a part of an outer peripheral surface thereof;

wherein said front housing is a member constructed with one or more members including coupling means for coupling to said rear housing, and a through hole, said through hole including a hole portion having an inner peripheral surface greater than an outer shape of said optical fiber positioning and fixing portion for projecting said optical fiber positioning and fixing portion of said ferrule at least at a tip end, a flange portion holding portion formed continuously with said hole portion and having a ferrule flying out preventing structure partly interfering with said flange portion of said ferrule, and a rear though hole portion having an inscribing circle greater than the outer diameter of said coil spring;

wherein said rear housing is a member constructed with one or more members having at least engaging means for coupling with said front housing, and a through hole, said engaging means having a structure for coupling said front housing and said rear housing by moving said rear housing frontward, on a rear end side of said through hole being formed with a fiber insertion hole having an inner diameter greater than the outer diameter of said optical cord and smaller than an inscribing circle of said optical cord fixing member, an optical cord fixing member holding portion being formed in front of said fiber insertion hole following thereto and having a greater hole shape than said fiber insertion hole and having fixing means, having an internal space greater than said optical cord fixing member, for holding and fixing said optical cord fixing member, on a tip end side of said through hole a coil spring holding portion for holding said coil spring and biasing the rear end of said coil spring being formed, and an optical cord fixing member introducing hole being formed between said coil spring holding portion and the optical cord fixing member holding portion, as a through opening having an internal peripheral shape greater than a sectional shape taken along a plane perpendicular to an axis of said optical cord fixing member; and wherein in a condition where said front housing and said rear housing are coupled to each other, a through space portion is defined therein, and the through space portion is defined such that said ferrule, to which the optical fiber of said optical cord is fixed, is held in a condition where a tip end of said optical fiber positioning and fixing portion of said ferrule is extended from the tip end of said front housing, said flange portion is arranged with restriction of position in the axial direction by said ferrule flying out preventing structure, and said flange portion of said ferrule is biased frontward by the tip end of said coil spring, said coil spring is biased frontward by the coil spring holding portion of said rear housing, and said optical cord fixing member, to which said optical cord is fixed, is fixed and held in said optical cord fixing member holding portion of said rear housing.

In the invention claimed in claim 2, it is characterized that, in the invention claimed in claim 1, said optical cord fixing member has a clamp seat and a clamp ring, said clamp seat is a member having a through hole having an inscribing circle greater than the outer diameter of said coated optical fiber and being formed with a tension resistance member fixing portion, said clamp ring is a member having a through hole with an inscribing circle greater than an outer diameter of said tension resistive member fixing portion of said clamp seat, and being formed with a tension resistive member fixing portion and a cord outer jacket fixing portion therein, after passing said coated optical fiber through said clamp seat and shifting the clamp seat to an end portion of exposed cord outer jacket, by placing an exposed tension resistive member along said tension resistive member fixing portion of said clamp seat, fitting said clamp ring over said clamp seat, along which said tension resistive member is placed, and the end portion of said cord outer jacket so as to cover them, and then clamping said tension resistive member fixing portion and said cord outer jacket fixing portion of said clamp ring, said tension resistive member and said cord outer jacket is fixed to said clamp seat and said clamp ring.

In the invention claimed in claim 3, it is characterized that, in the invention claimed in claim 1, a fixing portion for fixing the tension resistive member by bonding is formed on the outer peripheral portion of said optical cord fixing member, and said tension resistive member is fixed to said optical cord fixing member by an adhesive.

In the invention claimed in claim 4, it is characterized that, in the invention claimed in any one of claims 1 to 3, at least a part of said optical cord fixing member has a polygonal outer shape in section with a chamfered round corner, and a rotation preventing structure is formed in such a manner that at least a part of a receiving portion for said optical cord fixing member in said rear housing as a part of an inner shape of said optical cord fixing member holding portion of said rear housing has a substantially circular sectional shape of substantially the same size as a circumscribing circle of the polygonal optical cord fixing member with the chamfered round corner and more specifically has a surface by cutting out a part of said substantially circular shape so as to hold the optical cord fixing member to be rotatable within a predetermined angular range.

In the invention claimed in claim 5, it is characterized that, in the invention claimed in claim 4, a fixing member rotation restricting portion for restricting a rotation of the optical cord fixing member is provided in a through hole portion on opposite side of the through hole to the optical cord insertion hole, the through hole being communicated with said optical cord fixing member holding portion of said rear housing, said fixing member rotation restricting portion has a substantially circular inner shape with a surface cut out partially on the rear end side and an inner shape continuous with the circumscribing circle of said optical cord fixing member on the tip end side, and an inner shape at an intermediate portion located between the rear end side and the tip end side is a shape forming transition between two inner shapes.

In the invention claimed in claim 6, it is characterized that, in the invention claimed in any one of claims 1 to 5, a projecting portion is provided on the inner peripheral surface of the optical cord fixing member holding portion of the rear housing, when the optical cord fixing member is received within the hole of the optical cord fixing member holding portion, the optical cord fixing member is fixed in the rear housing by interference caused between said projecting portion and an outer peripheral surface of said optical cord fixing member.

In the invention claimed in claim 7, it is characterized that, in the invention claimed in any one of claims 1 to 6, a shape of an inner peripheral surface of the coil spring holding portion of said rear housing is substantially the same as a shape of the outer shape of said coil spring, and a projecting portion is provided on the inner peripheral surface for fixing said coil spring in the rear housing by interference between the outer surface of said coil spring and said projecting portion when said coil spring is received within said coil spring holding portion.

In the invention claimed in claim 8, it is characterized that, in the invention claimed in any one of claims 1 to 7, engaging means of said rear housing and said front housing is a structure formed with a cantilever provided in one of said rear and front housings and including an engaging projection at a tip end thereof, and an engaging hole provided in the other of said rear and front housings and adapted to receive said engaging projection.

In the invention claimed in claim 9, it is characterized that, in the invention claimed in any one of claims 1 to 8, said rear housing includes a rear housing body and a boot to be coupled with a rear portion of said rear housing body, and said rear housing body and said boot are preliminarily integrated with each other.

In the invention claimed in claim 10, it is characterized that, in the invention claimed in any one of claims 1 to 9, said front housing is formed with a front housing body and a finger grip covering the front housing body, and said front housing body and said finger grip are preliminarily integrated in a slidable fashion.

In the invention claimed in claim 11, it is characterized that, in the invention claimed in any one of claims 1 to 10, said optical cord fixing member is a member having a circumscribing circle smaller than an inner diameter of said coil spring at least after assembling said optical cord and said tension resistive member and said cord outer jacket are fixed to said optical cord fixing member.

In the invention claimed in claim 12, it is characterized that, in the invention claimed in claim 1, said optical cord fixing member has a substantially polygonal shape in section, a substantially planar wall surface for restricting rotation of said polygonal shape optical cord fixing member is formed at one or more positions on the inner peripheral surface of the hole of said optical cord fixing member holding portion of said rear housing.

In the invention claimed in claim 13, it is characterized that, in the invention claimed in claim 12, a rotation restricting portion for restricting rotation of said optical cord fixing member is formed on an inner peripheral surface of a portion continuous with said optical cord fixing member holding portion in said optical cord fixing member introducing hole of said rear housing, said restricting portion continuously increases in height and restricting area toward rearward, and continuous with the substantially planar wall surface formed on the inner peripheral surface of the hole of said optical cord fixing member holding portion.

In the invention claimed in claim 1, it is characterized that an optical connector plug, comprises: a front housing, a rear housing to be coupled with said front housing, a ferrule, a coil spring, and an optical cord fixing member, and connecting an optical cord including a coated optical fiber having an optical fiber and an optical fiber coat covering the optical fiber, a cord outer jacket further covering said coated optical fiber and a tension resistive member disposed between said coated optical fiber and said cord outer jacket, wherein said ferrule has an optical fiber positioning and fixing portion for positioning and fixing the optical fiber at a tip end of the coated optical fiber of said optical cord and a flange portion contacting with said coil spring and biased thereby, wherein said coil spring has a tip end portion for contacting with said flange portion of said ferrule and biasing the latter, and a rear end portion for contacting with said rear housing, said coil spring having predetermined inner and outer diameters, wherein said optical cord fixing member has an outer diameter capable of insertion into said coil spring and an inner diameter permitting insertion of said optical cord, when said optical cord is fixed thereto, and engaging means for engaging with said rear housing at least on a part of an outer peripheral surface, wherein said front housing includes engaging means for engaging with said rear housing, and a first through hole, said first through hole comprising a tip end side hole portion having an inner diameter greater than an outer diameter of said optical fiber positioning and fixing portion of said ferrule, an intermediate hole portion continuous with said tip end side hole portion, and having a flange portion holding portion for restricting frontward movement of the flange portion of said ferrule and receiving said flange portion, and a rear side hole portion having an inner diameter greater than an outer diameter of said coil spring, wherein said rear housing includes engaging means for engaging with said engaging means of said front housing by relatively moving said rear housing and said front housing toward each other, and a second through hole, on a rear end side of said second through hole, an optical cord inserting hole having an inner diameter permitting insertion of said optical cord but not permitting insertion of said optical cord fixing member is formed, in front of said optical cord insertion hole, an optical cord fixing member holding hole having fixing means for fixing said optical cord fixing member and receiving said optical cord fixing member is formed continuous with said optical cord insertion hole, on a tip end side of said second through hole, a coil spring holding portion for holding said coil spring and biasing the rear end of said coil spring is formed, and between said coil spring holding portion and said optical cord fixing member holding hole, an optical cord fixing member introducing hole for permitting insertion of said optical cord fixing member is formed, wherein in a condition where said front housing and said rear housing are coupled with each other, a through space portion is defined therein, and wherein said ferrule, said coil spring and said optical cord fixing member are received within said through space portion such that said ferrule is held in a condition where a tip end of said optical fiber positioning and fixing portion of said ferrule, to which the optical fiber of said optical cord is fixed, is extended from the tip end of said front housing, said flange portion is restricted forward movement by the flange portion holding portion of the front housing and is biased frontward by said coil spring, said coil spring is biased frontward by the coil spring holding portion of said rear housing, and said optical cord fixing member, to which said optical cord is fixed, is fixed and held by said optical cord fixing member holding hole of said rear housing.

Further, in a manufacturing method of an optical connector plug according to the invention, as recited in claim 15, it is characterized that the manufacturing method of an optical connector plug for connecting the optical connector plug with an optical cord including a coated optical fiber having an optical fiber and an optical fiber coat covering the optical fiber, a cord outer jacket further covering the coated optical fiber and a tension resistive member disposed between said coated optical fiber and said cord outer jacket, said method comprising: a first step of passing said optical cord through a rear housing and a coil spring; a second step of exposing the coated optical fiber and the tension resistive member at an end portion of said optical cord; a third step of fixing an optical cord fixing member to said optical cord by fixing said tension resistive member and said cord outer jacket by said optical cord fixing member; a fourth step of forming a cord pre-assembly part, in which said optical cord fixing member and a ferrule are fixed, by fixing said ferrule to a tip end of said coated optical fiber such that a relative spaced distance to said fixed optical cord fixing member becomes a preliminarily set predetermined distance; and a fifth step of coupling a front housing and the rear housing by movement in back and forth directions for accommodating said cord pre-assembly part and said coil spring.

In the invention claimed in claim 15, it is characterized that, in a manufacturing method invention claimed in claim 15, in said fourth step, said ferrule is fixed to the tip end of said coated optical fiber such that said ferrule is spaced apart from the optical cord fixing member by a relative spaced distance corresponding to that in a condition where said ferrule and said coil spring is held within a through space portion defined inside when said front housing and said rear housing are coupled, with a flange portion of said ferrule being biased frontward by said coil spring, and said optical cord fixing member is held within an optical cord fixing member holding hole of said rear housing with said coil spring being biased frontward by the coil spring holding portion of said rear housing.

In the invention claimed in claim 16, it is characterized that, in the invention claimed in claim 15 or 16, in said fourth step, a process including face polishing of an end face of said ferrule is performed.

In the invention claimed in claim 18, it is characterized that the manufacturing method of an optical connector plug for connecting the optical connector plug with an optical cord including a coated optical fiber having an optical fiber and an optical fiber coat covering the optical fiber, a cord outer jacket further covering the coated optical fiber and a tension resistive member disposed between said coated optical fiber and said cord outer jacket, said method comprising: a first step of passing said optical cord through a rear housing and a coil spring; a second step of exposing the coated optical fiber and the tension resistive member at an end portion of said optical cord; a third step of fixing a ferrule at a tip end of the coated optical fiber; a fourth step of forming a cord pre-assembly part, in which an optical cord fixing member and the ferrule are fixed, by fixing an optical cord fixing member to said optical cord by fixing said tension resistive member and said cord outer jacket by said optical cord fixing member such that a relative spaced distance to said fixed ferrule becomes a preliminarily set predetermined distance; and a fifth step of coupling a front housing and the rear housing by movement in back and forth directions for accommodating said cord pre-assembly part and said coil spring.

In the invention claimed in claim 9, it is characterized that, in the invention claimed in claim 18, in said fourth step, said ferrule is fixed to the tip end of said coated optical fiber such that said ferrule is spaced apart from the optical cord fixing member by a relative spaced distance corresponding to that in a condition where said ferrule and said coil spring is held within a through space portion defined inside when said front housing and said rear housing are coupled, with a flange portion of said ferrule being biased frontward by said coil spring, and said optical cord fixing member is held within an optical cord fixing member holding hole of said rear housing with said coil spring being biased frontward by the coil spring holding portion of said rear housing.

In the invention claimed in claim 20, it is characterized that, in the invention claimed in claim 18 or 19, in said third step, a process including face polishing of an end face of said ferrule is performed.

In the invention claimed in claim 19, it is characterized that, in the invention claimed in claim 17 or 18, in said fourth step, a process including face polishing of an end face of said ferrule is performed.

In the invention claimed in claim 21, it is characterized that the assembling tool of an optical connector plug for use upon fixing a ferrule and an optical cord fixing member to an optical cord including a coated optical fiber having an optical fiber and an optical fiber coat covering the optical fiber, a cord outer jacket further covering the coated optical fiber and a tension resistive member disposed between said coated optical fiber and said cord outer jacket, such that said ferrule and said optical cord fixing member are spaced apart by a predetermined distance, said assembling tool comprising: an optical cord fixing member holding means for holding said optical cord fixing member fixing the tension resistive member and the cord outer jacket of said optical cord; ferrule holding means for positioning and holding said ferrule so that said ferrule is spaced apart from said optical cord fixing member held by said optical cord fixing member holding means by a distance corresponding to said predetermined distance; and wherein said optical fiber of said optical cord is fixed by bonding to said ferrule held by said ferrule holding means.

In the invention claimed in claim 22, it is characterized that the assembling tool of an optical connector plug for use upon fixing a ferrule and an optical cord fixing member to an optical cord including a coated optical fiber having an optical fiber and an optical fiber coat covering the optical fiber, a cord outer jacket further covering the coated optical fiber and a tension resistive member disposed between said coated optical fiber and said cord outer jacket, such that said ferrule and said optical cord fixing member are spaced apart by a predetermined distance, said assembling tool comprising: ferrule holding means for holding the ferrule to which the optical fiber of said optical cord is fixed by bonding; optical cord fixing member holding means for positioning and holding said optical cord fixing member so that said optical cord fixing member is spaced apart from said ferrule held by said ferrule holding means by a distance corresponding to said predetermined distance; and wherein said tension resistive member and said cord outer jacket of said optical cord is processed to be fixed to said optical cord fixing member held by said optical cord fixing member holding means.

In the invention claimed in claim 23, it is characterized that the assembling tool of an optical connector plug for use upon assembling said optical connector plug with an optical cord using a cord pre-assembly part, in which a ferrule and an optical cord fixing member fixing said optical cord are fixed so as to be spaced apart by a predetermined spaced distance, said optical cord including a coated optical fiber having an optical fiber and an optical fiber coat covering the optical fiber, a cord outer jacket further covering the coated optical fiber and a tension resistive member disposed between said coated optical fiber and said cord outer jacket, said assembling tool comprising: front housing holding means for holding a front housing on a front side of said ferrule of said cord pre-assembly part; assembly holding means for holding the ferrule or the optical cord fixing member of said cord pre-assembly part; rear housing holding means, movable in back and forth directions, for holding a rear housing, through which said optical cord of said cord pre-assembly part is inserted, and provided with a coil spring, on a rear side of said optical cord fixing member of said cord pre-assembly part; frictional resistance applying means for applying a frictional resistance force to said optical cord on a back side of said rear housing holding means; and wherein said rear housing is coupled with said front housing in a condition accommodating said ferrule, said optical cord fixing member and said coil spring by frontward movement of said rear housing holding means.

In the invention claimed in claim 24, it is characterized that the assembling tool of an optical connector plug for use upon assembling said optical connector plug with an optical cord using a cord pre-assembly part, in which a ferrule and an optical cord fixing member fixing said optical cord are fixed so as to be spaced apart by a predetermined spaced distance, said optical cord including a coated optical fiber having an optical fiber and an optical fiber coat covering the optical fiber, a cord outer jacket further covering the coated optical fiber and a tension resistive member disposed between said coated optical fiber and said cord outer jacket, said assembling tool comprising: assembly holding means for holding the ferrule or the optical cord fixing member of said cord pre-assembly part; rear housing holding means for holding a rear housing, through which said optical cord of said cord pre-assembly part is inserted, and provided with a coil spring, on a rear side of said optical cord fixing member of said cord pre-assembly part; cord pulling means for pulling said optical cord on a rear side of said rear housing holding means; front housing holding means, movable in back and forth directions, for holding a front housing on a front side of said ferrule of said cord pre-assembly part; and wherein said front housing is engaged with said rear housing in the condition accommodating said ferrule, said optical cord fixing member and said coil spring by moving said front housing holding means backward and pulling and moving said optical cord backward by said cord pulling means.

In the invention claimed in claim 25, it is characterized that the optical connector plug to be connected to an end portion of an optical cord having an coated optical fiber including an optical fiber and an optical fiber coat covering said optical fiber, a cord outer jacket further covering said coated optical fiber and a tension resistive member disposed between said coated optical fiber and said cord outer jacket, said optical connector plug comprising: a ferrule having a flange portion and fixing an optical fiber exposed at a terminal end of said optical cord; an optical cord fixing member for fixing an exposed tension resistive member and said cord outer jacket of said optical cord on a rear side of said ferrule; a coil spring capable of insertion of said optical cord and contacting with a flange portion of said ferrule at a tip end thereof; a front housing having a through hole and a holding portion for holding the ferrule loaded in the through hole inside of the housing in such a manner that a tip end of said ferrule projects from a front face opening; a rear housing including a through hole, a spring engaging portion for engaging with a rear portion of said coil spring loaded on a front side of said through hole, and an optical cord fixing member engaging portion engaging with said optical cord fixing member to be inserted up to a rear portion of said through hole from a front side, and wherein said optical cord fixing member is provided with an external dimension capable of passing through inside of said coil spring and being accommodated in said rear housing, and said ferrule, said coil spring and said optical cord fixing member are received and secured within a space defined by engaging said front housing and said rear housing.

(Effect of the Invention of claims 1 to 17)

With the optical connector plug or the manufacturing method according to the present invention, the terminating step of the optical cord requiring manpower, the fixing step of the optical cord and the fixing step of fixing the optical fiber on the ferrule can be united into a series of steps even through order of the steps is variable. Therefore, automating of assembling of the optical connector plug which has been relatively difficult, can be easily realized to make assembling of the optical connector plug efficient.

On the other hand, in assembling of the optical connector plug, operation associated with assembling can be realized with simple operation, namely substantially back and forth movement of the parts along optical axis direction. Therefore, assembling can be realized by a relatively simple automatic assembling machine to facilitate automating.

(Effect of the Invention of Claims 1, 14 and 26)

In the present invention, fixing of the outer jacket of the optical cord and the tension resistive member can be realized by individual members independent of the housing body (the front housing and the rear housing). Therefore, in the present invention, the force by clamping is not exerted on the housing to realize production of the housing body portion required complicate shape by molding of plastic or the like. Therefore, cost for the parts can be lowered.

On the other hand, since the optical cord fixing member has quite a simple construction, it can be realized at low cost. Furthermore, since the optical cord fixing member may be inserted through the coil spring, it becomes possible to move the coil spring back and forth in the direction of the optical axis of the optical cord fixing member after assembling the optical cord to the optical cord fixing member. By this, the optical cord can be fixed before arranging the coil spring at the predetermined position.

In the present invention, even when the optical cord is pulled, the external force acts on the rear housing via the optical cord fixing member and is borne by the stationary portion of the counterpart, such as a casing, an adapter or the like, which is coupled with the plug via the front housing which is coupled with the rear housing. Accordingly, since this force does not act on the ferrule directly, degradation of connection characteristics due to offset in position of the ferrule will never be caused.

On the other hand, in the optical connector plug according to the present invention, a construction wherein fixing of the ferrule to the optical fiber can be performed in the condition where the ferrule and the optical fiber are distant from other parts or other parts are not present. Therefore, when the ferrule is bonded by adhesive, operation can be performed easily.

(Effect of the Invention of Claims 2 or 3)

With this invention, the clamping seat can be a cylindrical part of metal or the like. Also, the clamp ring is also a substantially cylindrical metal part. Thus, these parts can be realized at low cost. On the other hand, since the tension resistive member and the optical cord outer jacket are firmly fixed, a highly reliable optical connector can be provided. Furthermore, fixing by clamping of the cord outer jacket and the tension resistive member using these can be quite simply performed by placing the tension resistive member along the tension resistive member fixing portion on the outer surface of the clamp seat and fixing the tension resistive member and the cord outer jacket by clamping the clamp ring after fitting the clamp ring.

(Effect of the Invention of Claims 4 and 12)

With this invention, since the rotation preventing structure is provided between the optical cord fixing member and the rear housing, even if the optical cord is twisted, for example, rotation is prevented for avoiding rotation of the optical cord within the optical connector plug to cause twisting and so on resulting in breakage of the optical fiber or other failure. Therefore, a highly reliable optical connector plug can be provided.

(Effect of the Invention of Claims 5 and 13)

With this invention, since the tapered guide wall surface is provided for guiding the optical cord fixing member for placing at a predetermined angular position for preventing rotation of the optical cord fixing member, the optical cord fixing member can be guided to the predetermined angular position for preventing the optical cord fixing member only by operation to relatively move the optical cord fixing member and the rear housing in a direction to approach with each other in the direction of optical axis. This operation can be completed only by relatively moving the optical cord fixing member and the rear housing to approach with each other in the direction of optical axis, high workability is achieved and automating can be facilitated.

(Effect of the Invention of Claim 6)

With this invention, the optical cord fixing member can be certainly arranged and held at a predetermined position within the housing only by moving the optical cord fixing member and the rear housing relatively in the optical axis direction.

(Effect of the Invention of Claim 7)

With this invention, by preliminarily integrating the rear housing and the coil spring by inserting the coil spring in the coil spring holding portion of the rear housing, it becomes possible to handle the coil spring which is difficult to handle for small size and resiliency together with the rear housing which is easier to handle for relatively large size. By this, reduction of number of parts in assembling and simplification of assembling operation facilitates automating.

(Effect of the Invention of Claim 8)

With this invention, since the rear housing and the front housing are engaged by an engaging projection and an engaging hole, assembling of these components can be facilitated.

(Effect of the Invention of Claim 9)

With this invention, the rear housing is constructed with a rear housing body and a boot coupled with the rear portion of the rear housing body, and takes a construction, in which the rear housing body and the boot are preliminarily integrated to permit handling of these rear housing body and the boot together so as not to cause degradation of characteristics against bending with eliminating work load for assembling the boot and thus facilitates automating.

(Effect of the Invention of Claim 10)

With this invention, since the front housing body and the finger grip are preliminarily integrated in a slidable fashion, number of parts in assembling can be reduced and assembling operation can be simplified. Furthermore, automating is facilitated.

(Effect of the Invention of Claim 11)

With this invention, the optical cord fixing member is formed as a member, which can be inserted into the coil spring in the condition where at least the optical cord is assembled to fix the tension resistive member and the cord outer jacket to the optical cord fixing member. Therefore, after fixing the optical cord to the optical cord fixing member, the coil spring can be moved back and forth in the optical axis direction of the optical cord fixing member. By this, fixing of the optical cord can be performed in advance of arranging the coil spring at the predetermined position.

(Effect of the Inventions of Claims 22 and 23)

With the assembling tool of the present invention, the ferrule and the optical cord fixing member can be easily fixed to the optical cord so that a relative distance can be maintained at a predetermined value. Therefore, a process step for measuring the distance can be eliminated to make assembling operation efficient and realize lowering of manufacturing cost. Furthermore, good optical characteristics of the optical connector plug as assembled can be maintained.

(Effect of the Inventions of Claims 24 and 25)

With the assembling tool of the present invention, since engaging operation of the front housing and the rear housing is to be performed with applying frictional resistance or tension force on the optical cord, built-in parts, such as the optical cord fixing member, the coil spring, the ferrule and so on can be certainly held and engaged at the predetermined position within the internal space of the front housing and the rear housing. Thus, assembling operation can be made efficient and lowering of cost can be realized.

BRIEF DESCRIPTION OF THE DRAWING

FIGS. 5A to 5E are illustrations showing one embodiment of an optical cord fixing member;

FIGS. 24A to 24D are illustrations showing a still further embodiment of the assembling tool to be employed upon assembling the optical connector plug according to the present invention.

BEST MODE FOR IMPLEMENTING THE INVENTION

Hereinafter, the present invention will be described in detail with reference to the drawings.

(Explanation of Invention Corresponding to Claims 1, 14 and 26)

Figure 1:
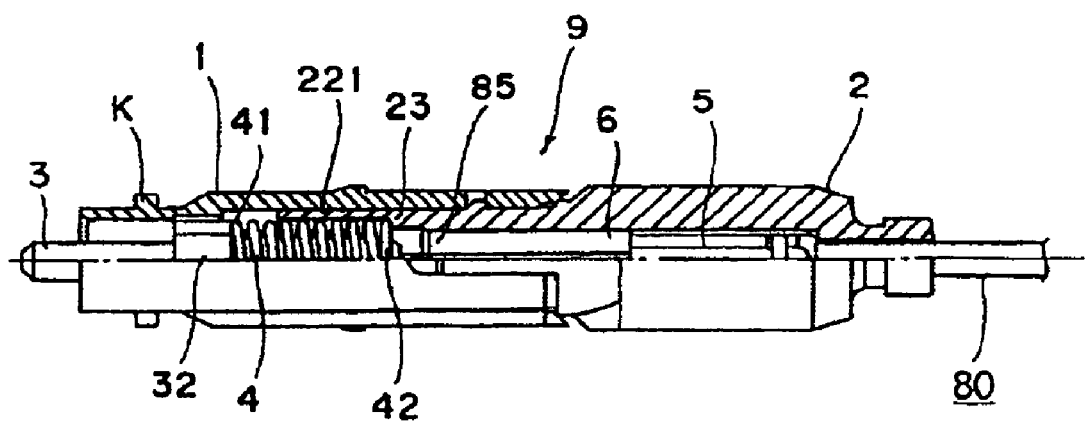
FIG. 1 is a section showing one embodiment of an optical connector plug according to the present invention, illustrating a construction after assembling with cutting out the upper portion.
Figure 2:
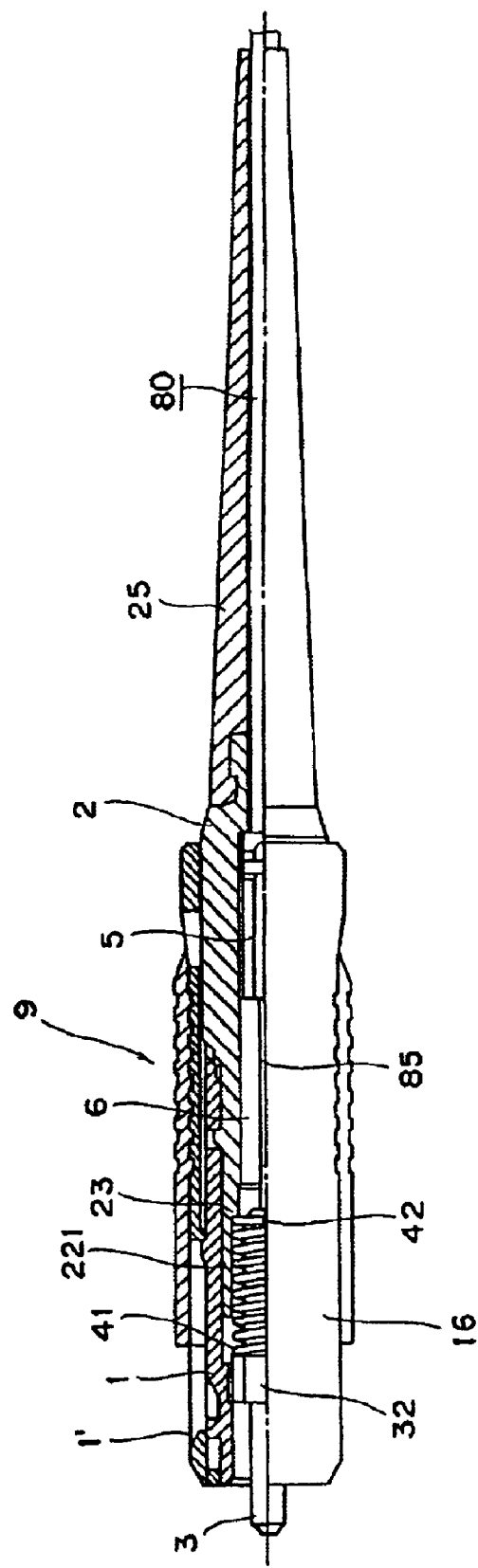
FIG. 2 is a section showing another embodiment of an optical connector plug according to the present invention, illustrating a construction after assembling with cutting out the upper portion.

One embodiment applied to an MU type optical connector plug according to the present invention is illustrated in FIGS. 1 and 2 in partially cut-out form.

FIG. 1 shows a connector plug 9 of a type to be connected to an adapter or the like by an engaging projection K, and FIG. 2 shows a connector plug 9 of a push-pull coupling structure.

Figure 18:
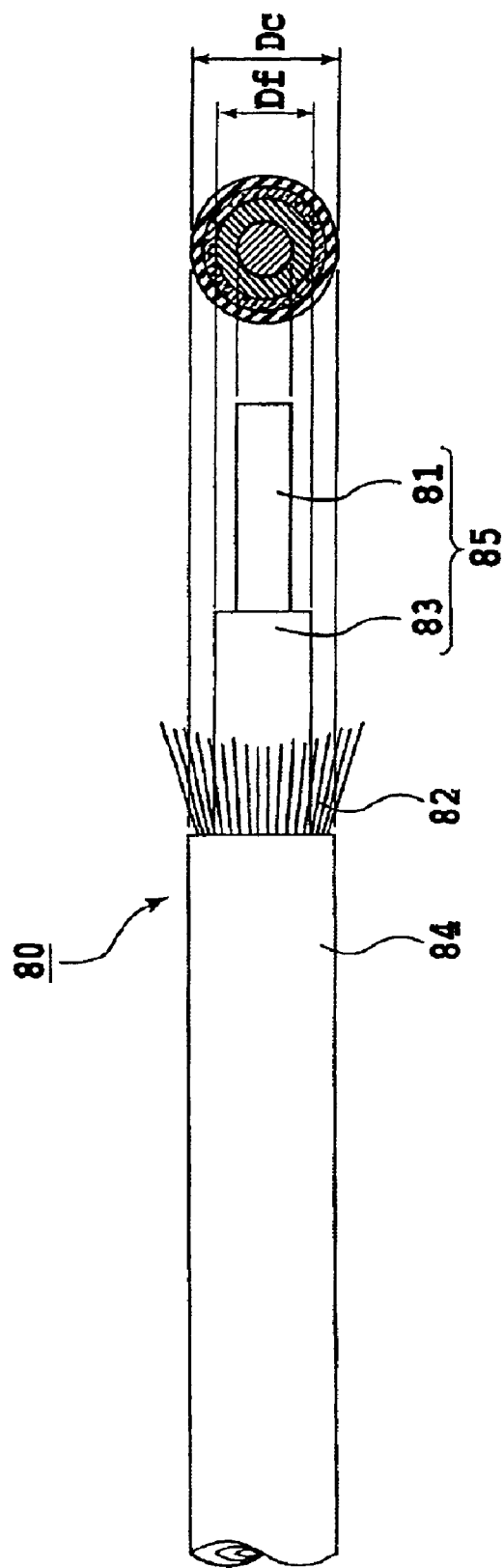
FIG. 18 is an illustration showing a construction of an optical cord connected to the optical connector plug according to the present invention.
Figures 19A, 19B, 19C, 19D, 19E, 19F, 19G, 19H:
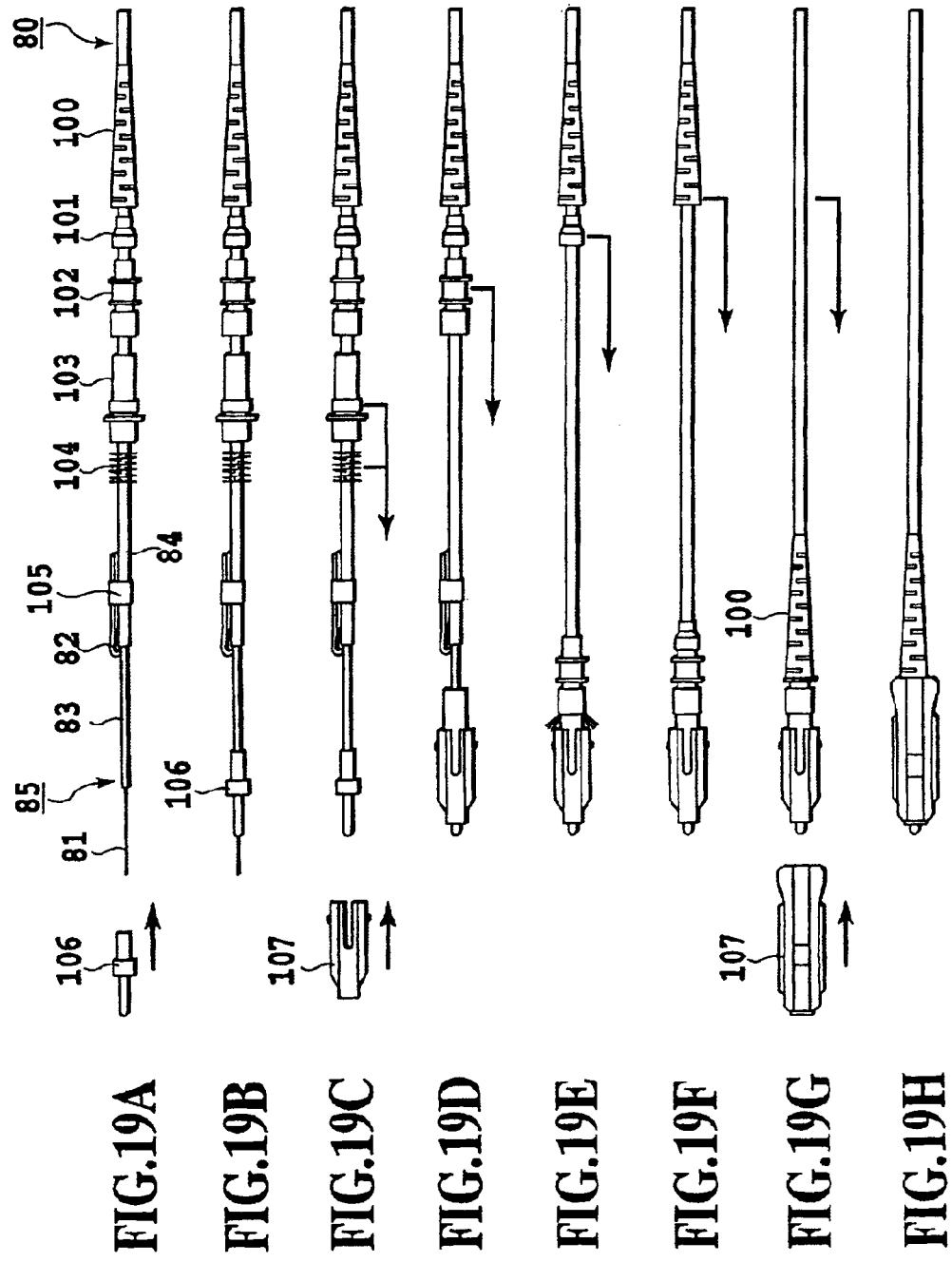
FIGS. 19A to 19H are illustrations showing process steps showing manufacturing procedure of the conventional optical connector plug.

The optical connector plugs 9 shown in FIGS. 1 and 2 are for forming an end portion of the single core type optical cord shown in FIG. 18. As shown in FIG. 18, the optical cord 80 includes an coated optical fiber 85 consisted of an optical fiber 81 and an optical fiber coat (inner coating) 83, a cord outer jacket 84 and a tension resistive member 82.

The optical connector plug 9 shown in FIGS. 1 and 2 has a front housing 1, a rear housing 2 coupled with the front housing 1 and arranged rearward in an optical axis direction of the front housing 1, a ferrule 3, a coil spring 4 and an optical cord fixing member 5.

Figure 3C:
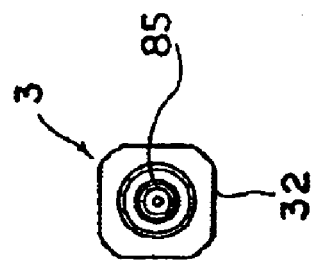
FIGS. 3A to 3D are illustrations showing one embodiment of a construction of a ferrule.
Figure 3A:
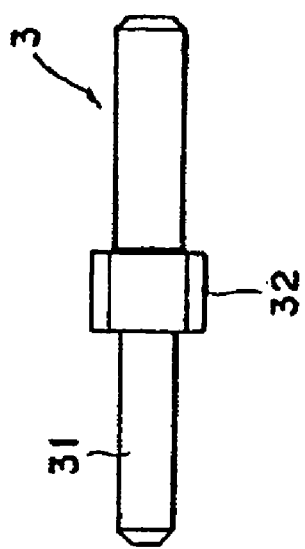
Figure 3D:
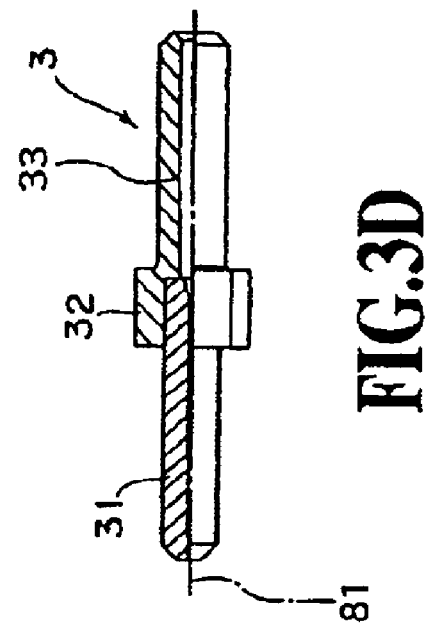
Figure 3B:
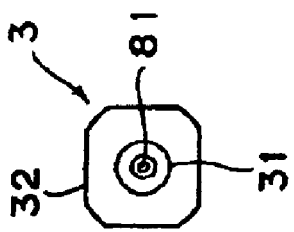

FIGS. 3A to 3D show a construction of the ferrule 3, wherein FIG. 3B is a left side elevation of FIG. 3A, FIG. 3C is a right side elevation of FIG. 3A and FIG. 3D is a section of FIG. 3A.

As shown in FIGS. 3A to 3D, the ferrule 3 has an optical fiber positioning and fixing portion 31 for fixing and positioning the optical fiber 81 within a hole formed inside thereof by an adhesive or the like, for example, a flange portion 32 contacting with the coil spring 4 within the front housing 1 to be biased frontward in the optical axis direction, and a coated optical fiber guide hole 33, into which an coated optical fiber 85 is inserted.

Figure 4:
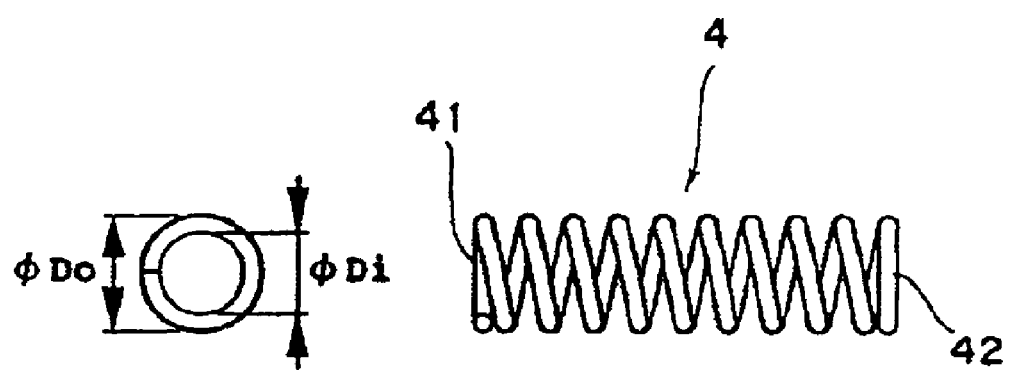
FIG. 4 is an illustration showing one embodiment of a structure of a coil spring.

FIG. 4 shows a construction of the coil spring 4.

As shown in FIG. 4, the coil spring 4 has a tip end portion 41 contacting with the ferrule 3 and biasing the latter and a rear end portion 42 contacting with the rear housing 2. Also, the coil spring 4 has an inner diameter Di and an outer diameter Do.

FIGS. 5A to 5E show a construction of the optical cord fixing member 5.

As shown in FIGS. 5A to 5E, the optical cord fixing member 5 is a member constructed with one or more members and has a structure 51 for fixing the cord outer jacket 84 and/or the tension resistive member 82 of the optical cord 80 depending upon the structure of the optical cord 80 to be used. The optical cord fixing member 5 has an outer diameter D5o smaller than the inner diameter Di of the coil spring 4 after assembling and fixing the optical cord 80.

Accordingly, even after fixing the optical cord 80 to the optical cord fixing member 5, the optical cord fixing member 5 is inserted within the coil spring 4.

On the other hand, the optical cord fixing member 5 has the structure having greater inner diameter D5i than the outer diameter Df of the coated optical fiber 85. Therefore, even after fixing the tension resistive member 82 of the optical cord 80 and the cord outer jacket 84 to the optical cord fixing member 5, the coated optical fiber 85 will never be interfered its motion in the axial direction by the optical cord fixing member 5. Namely, in the condition where the cord outer jacket 84 and the tension resistive member 82 are firmly fixed to the optical cord fixing member 5, even when the cord outer jacket 84 is pulled backward, a force is not exerted on the coated optical fiber 85 per se and breakage and so on of the coated optical fiber 85 can not be caused.

On the other hand, because of the construction where the coated optical fiber 85 is not fixed, in the case of a so-called loose type optical cord, in which the optical fiber is not fixed to the cord outer jacket 84 and the tension resistive member 82 in an axial direction, the coated optical fiber 85 can move within the optical cord 80 depending upon movement of the ferrule 3 even if the ferrule 3 fixing the coated optical fiber 85 is moved slightly in the axial direction within the optical connector plug 9, upon use of the optical connector plug. By this, the coated optical fiber 85 will never be deflected or excessively pulled within the optical connector plug 9.

Furthermore, the optical cord fixing member 5 is provided with an engaging portion 511 for engaging with an inner surface of the rear housing at least at a portion of the outer peripheral surface. As will be explained later, the engaging portion 511 engages with a projecting portion 241 formed on the inner peripheral surface of the optical cord fixing member holding portion (optical cord fixing member holding hole) 222.

Figure 6A:
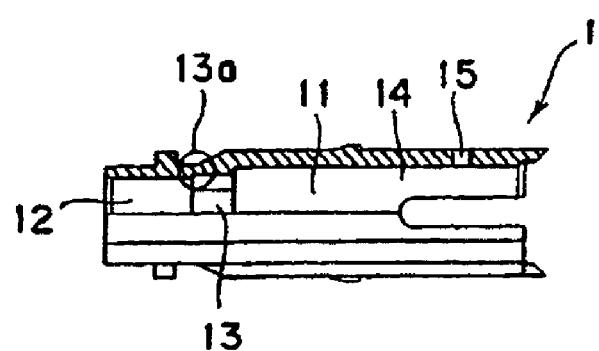
FIGS. 6A to 6D are illustrations showing one embodiment of a front housing.
Figure 6B:
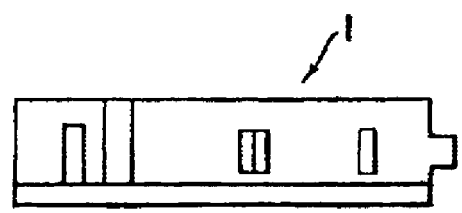
Figure 6C:
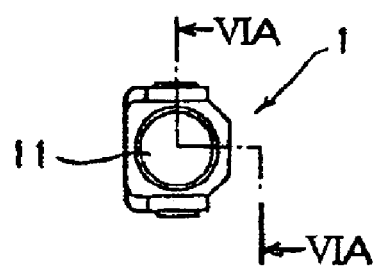
Figure 6D:
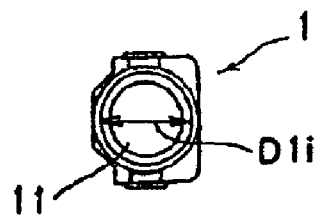

FIGS. 6A to 8 show an example of the front housing. In FIG. 6, there is shown the front housing 1 corresponding to the connector plug 9 of engaging projection coupling type shown in FIG. 1. FIG. 6C is a left side elevation of FIG. 6A and FIG. 6D is a right side elevation of FIG. 6A. In FIGS. 7 and 8A to 8D, there is shown a front housing 1' corresponding to the connector plug 9 of the push-pull coupling structure shown in FIG. 2. FIG. 8C is a left side elevation of FIG. 8A, and FIG. 8D is a right side elevation of FIG. 8A.

The front housing 1 (or 1') shown in FIGS. 6 to 8D has a through hole 11 and has a hole 12 having an inner diameter greater than the outer diameter of the positioning and fixing portion 31 so as to project the optical fiber positioning and fixing portion 31 (see FIG. 2) of the ferrule 3 from at least the tip end portion of the through hole 11. On the other hand, the front housing 1 (or 1') has a flange portion holding portion (holding hole) 13 having a ferrule flying out preventing structure for restricting movement of the ferrule 3 in forward direction by restricting a part of the flange portion 32 of the ferrule 3 following the hole portion 12, a rear through hole portion 14 having an inner diameter (inscribing circle) D1i (FIG. 6D) larger than the outer diameter Do of the coil spring 4, and an engaging portion (hole) 15 as an engaging means to be coupled with the rear housing 2.

The ferrule flying out preventing structure is realized by providing a step at a boundary between the hole 12 and the hole 13 restricting forward movement of the flange portion 32 of the ferrule 3, as shown by reference numeral 13a in FIG. 6A.

Figure 9A:
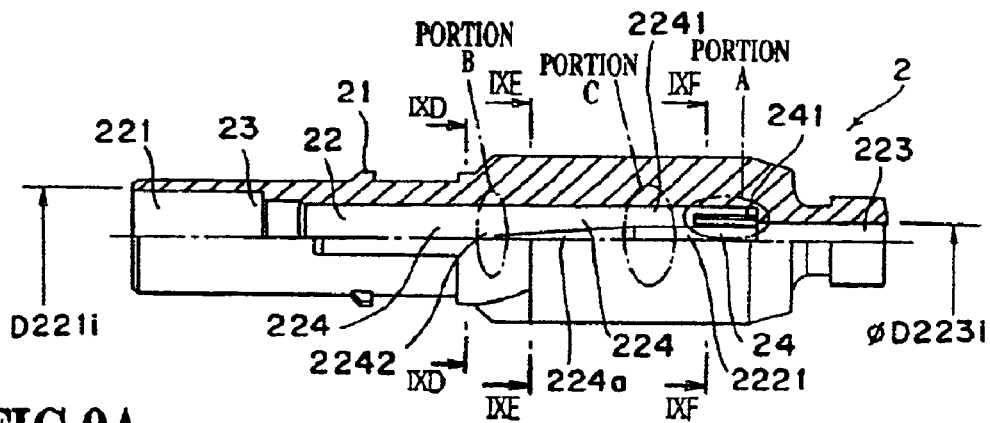
FIGS. 9A to 9I are illustrations showing one embodiment of a rear housing.
Figure 9B:
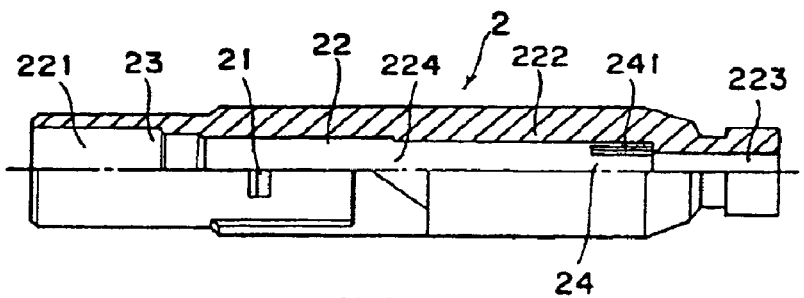
Figure 9C:
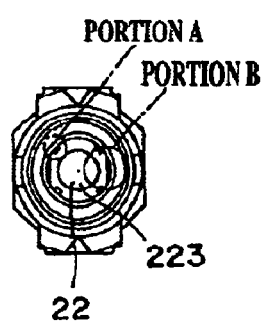
Figure 9D:
Figure 9E:
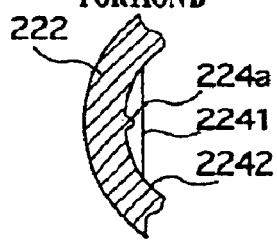
Figure 9F:
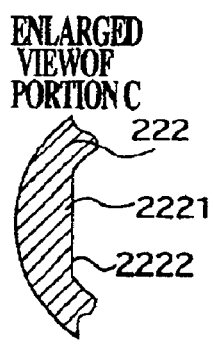
Figure 9G:
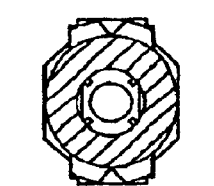
Figure 9H:
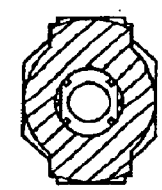
Figure 9I:
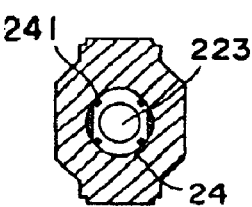

FIGS. 9A to 9I show a construction of the rear housing 2. FIG. 9D is an enlarged view of portion A of FIG. 9A, FIG. 9E is an enlarged view of portion B of FIG. 9A, FIG. 9F is an enlarged view of portion C of FIG. 9A, FIG. 9G is a section taken along line IXD—IXD of FIG. 9A, FIG. 9H is a section taken along line IXE—IXE of FIG. 9A, and FIG. 9I is a section taken along line IXF—IXF of FIG. 9A.

As shown in FIGS. 9A to 9I, the rear housing 2 is formed with an engaging projection 21 as an engaging means to be coupled with the engaging hole 15 of the front housing 1, and a through hole 22.

On the rear end side of the through hole 22, formed is an optical cord insertion hole 223 having an inner diameter D223i greater than the outer diameter Dc (FIG. 18). Upon assembling the optical connector plug, the rear end portion of the optical cord 80 fixed to the optical cord fixing member 5 is inserted into this optical cord insertion hole 223. Following the optical cord insertion hole 223, an optical cord fixing member holding portion 222 having greater hole shape than the optical cord insertion hole 223 is formed. Upon assembling the optical connector plug, the optical cord fixing member 5, to which the optical cord 80 is fixed, is held and fixed to the optical cord fixing member holding portion 222.

In the assembled condition of the optical connector plug, if the optical cord 80 is pulled backwardly, a force to be exerted on the optical cord 80 is exerted on the optical cord fixing member holding portion 222 via the optical cord fixing member 5 to further pull the rear housing 2 via this portion. Accordingly, in the assembled condition of the optical connector plug 9, namely in the condition where the rear housing 2 is coupled with the front housing 1 by the engaging portion 21, the force upon pulling the optical cord 80 is exerted on the coupling portion of the front housing 1 and the rear housing 2 of the optical connector plug 9 and will never be exerted on the coil spring 4, the coated optical fiber 85 and the ferrule 3 held within these housings.

On the other hand, on the tip end side of the through hole 22, a coil spring holding portion 221 is formed for holding the coil spring 4 as assembled. In conjunction therewith, the coil spring holding portion 221 biases the rear end portion 42 of the coil spring 4 for compressing frontward in the assembled condition of the optical connector plug 9. Between the coil spring holding portion 221 and the optical cord fixing member holding portion 222, an optical cord fixing member introducing hole 224 as a through hole having an inner peripheral surface shape greater than the shape in section of the outer periphery perpendicular to the axis and having a greater hole diameter than a final outer diameter of the optical cord fixing member 5. With this construction, the optical cord fixing member 5 can be inserted into the optical cord fixing member holding portion 222 of the rear housing 2 by leading it from the tip end side.

Next, the optical connector plug 9 according to the present invention has a structure to form a through space portion 6 in the condition where the front housing 1 and the rear housing 2 are coupled with each other as shown in FIG. 1. In the condition where the foregoing components are assembled, the ferrule 3 and the coil spring 4 are held in the condition where the flange portion 32 of the ferrule 3 is biased frontward by the tip end portion 41 of the coil spring 4 within the through space portion 6. Furthermore, by abutting the coil spring 4 onto a coil spring abutting portion 23 of the coil spring holding portion 221 of the rear housing 2, the coil spring 4 is compressed to be biased frontwardly.

With this construction, by moving the front housing 1 from the front side of the ferrule 3 and moving the coil spring 4 and the rear housing 2 from the rear side, the ferrule 3 is biased frontwardly with a predetermined force and is held within the coupled front housing 1 and the rear housing 2. At the same time, the optical cord fixing member 5 is held in the optical cord fixing member holding portion 222 of the rear housing 2, and the optical cord fixing member 5 is secured to the optical cord fixing member engaging portion 24.

(Explanation of the Invention Corresponding to Claim 2)

Next, with reference to FIGS. 5A to 5D, a particular construction 51 for fixing the cord outer jacket 84 of the optical cord 80 and the tension resistive member 82 to the optical cord fixing member 5 will be described.

FIG. 5B is a left side elevation of FIG. 5A, FIG. 5C shows a clamp seat 52, FIG. 5D shows a clamp ring 53, and FIG. 5E shows a right side elevation of FIG. 5D.

The optical cord fixing member 5 is constructed with two members, i.e. the clamp seat 52 and the clamp ring 53. The clamp seat 52 has a sectional shape, in which a through hole 521 having an inner diameter (inscribing circle) D5$i$ greater than the outer diameter Df of the coated optical fiber 85 (FIG. 18), and the tension resistive member fixing portion 522 is formed on the outside.

The clamp ring 53 is a member formed with a through hole 531 having an inner diameter (inscribing circle) D51$i$ greater than the outer diameter D52$o$ of the tension resistive member fixing portion 522 of the clamp seat 52. Within the through hole 531, a tension resistive member fixing portion 532 and a cord outer jacket fixing portion 533 are formed.

Upon assembling, as shown in FIG. 5A, the coated optical fiber 85 is inserted through the through hole 521 of the clamp seat 52. After moving the clamp seat 52 up to an end 841 of the cord outer jacket 84, the tension resistive member 82 is placed along the tension resistive member fixing portion 522 on the outer surface of the clamp seat 52, and the clamp ring 53 is fitted to cover the clamp seat 52, on which the tension resistive member 82 is placed, and a tip end portion 842 of the cord outer jacket. Thereafter, by clamping the tension resistive member fixing portion 532 and the cord outer jacket member fixing portion 533 of the clamp ring 53, the tension resistive member 82 and the cord outer jacket 84 are fixed to the optical cord fixing member 5 consisted of the clamp seat 52 and the clamp ring 53.

(Explanation of the Invention Corresponding to Claim 3)

The structure 51 for fixing the cord outer jacket 84 and the tension resistive member 82 of the optical cord 80, namely the optical cord fixing member 5 is a member constructed from one or a plurality of members and may be member having a structure for fixing the cord outer jacket 84 and/or the tension resistive member 82 depending upon the structure of the optical cord to be used. On the other hand, a dimension of the structure for fixing the cord outer jacket 84 and the tension resistive member 82 of the optical cord 80 at least after assembling and fixing the optical cord 80 is to have a circumscribing circle of a diameter smaller than the inner diameter of the coil spring 4 and have an inscribing circle of a diameter greater than the outer diameter of the coated optical fiber 85. Namely, as set forth above, when the optical cord 80 is fixed such as by clamping, it is not always required that a dimension prior to clamping satisfies the foregoing condition, and it is enough that a dimension after clamping satisfies the condition.

On the other hand, the optical cord fixing member 5 may be a member having an engaging portion 511 at least on a part of the outer peripheral surface for engaging with the inner peripheral surface of the rear housing.

Figure 10A:
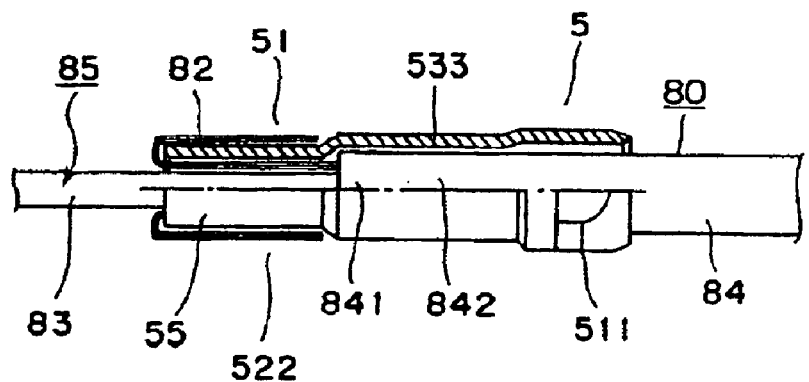
FIGS. 10A to 10C are illustrations respectively showing other embodiments of the optical cord fixing member.
Figure 10B:
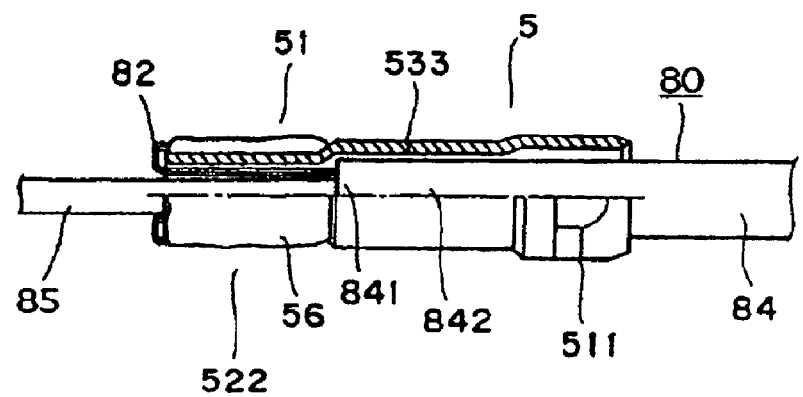
Figure 10C:
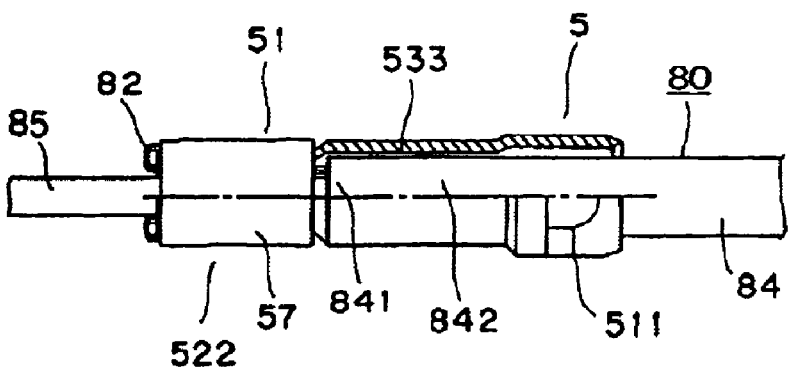

FIGS. 10A to 10C show other embodiments of the structures 51 for fixing the cord outer jacket 84 and the tension resistive member 82 with respect to the optical cord fixing member 5.

In FIG. 10A, a fixing portion 55 for fixing the tension resistive member 82 to the outer peripheral portion of the optical cord fixing member 5 by bonding, is formed. In FIG. 10B, there is shown a structure for fixing the tension resistive member 82 to the optical cord fixing member 5 by adhesive 56. In FIG. 10C, there is shown a structure for fixing the tension resistive member 82 to the optical cord fixing member 5 with a heat shrinkable tube 57 applied adhesive molten by heat on the inner surface.

Even in these fixing structures 51, their dimensions only require to have a circumscribing circle having a smaller diameter than the inner diameter of the coil spring 4 and an inscribing circle having a greater diameter than the outer diameter of the coated optical fiber 85 when the optical cord 80 is assembled and fixed.

(Explanation of the Invention of Claims 4 and 12)

In the condition where the optical connector plug 9 is assembled, it is desirable that the coated optical fiber 85 is not twisted within the optical connector plug 9 even when the optical cord 80 on the rear side is twisted. Accordingly, it is desirable that the optical cord fixing member 5, to which the optical cord 80 is fixed, has a structure not to rotate within the optical connector plug 9 when such a twisting force is applied.

Thus, as shown in FIGS. 5B and 5E, an outer contour of the optical cord fixing member 5 is a polygonal shape with rounded corner portions. In other words, a part of (for example, a rear end portion of) the outer contour of the section is formed into polygonal shape chamfered into round shape.

Furthermore, as shown in FIGS. 9F, 9I and so on, a part of the contour of the inner periphery of the optical cord fixing member holding portion 222 of the rear housing 2 is shaped so as to be engageable with the optical cord fixing member 5 of polygonal shape and preventing rotation. Namely, as shown in FIGS. 9F, 9I and so on, the shape of the contour of the inner periphery of the optical cord fixing member holding portion 222 is substantially circular shape having substantially the same size as the circumscribing circle of the polygonal optical cord fixing member 5 with chamfered corners, with adding substantially arc-shaped portions 2221 having substantially planar wall surfaces 2222 on both sides.

Namely, at least a part of a portion of inner periphery of the optical cord fixing member holding portion 222 of the rear housing 2, corresponding to the portion for receiving the optical cord fixing member 5 as assembled, is formed into a sectional shape of substantially circular shape of the size substantially the same as the circumscribing circle of the optical cord fixing member by chamfering the corners of the polygonal shape for providing rounded corners. In greater detail, the sectional shape of the optical cord fixing member holding portion 222 is generally circular shape with at least partly cut out to form planar portions 2222.

With such construction, when the optical cord fixing member 5 is assembled within the rear housing 2, the planar portions of the optical cord fixing member 5 of polygonal shape abut with the planar portion 2222 of the optical cord fixing member holding portion 222. Accordingly, when the optical cord fixing member 5, to which the optical cord 80 is fixed, is assembled within the optical cord fixing member holding portion 222 of the rear housing 2, the optical cord fixing member 5 is held to rotate quite a small angular range relative to the rear housing 2 or to rotate within a predetermined angular range relative to the rear housing 2. Therefore, rotation of the optical cord fixing member 5 is prevented. Consequently, the coated optical fiber 85 in the optical connector plug 9 may not be twisted.

(Explanation of Claims 5 and 13)

As set forth above, when a rotation preventing means is provided for holding the optical cord fixing member 5 relative to the optical cord fixing member holding portion 222 at a predetermined angular position, it becomes necessary to arrange the optical cord fixing member 5 and the optical cord fixing member holding portion 222 in the rear housing at a predetermined angle relative to each other so as to allow the optical cord fixing member 5 to be inserted up to the optical cord fixing member holding portion 222 within the rear housing 2 when the optical cord fixing member 5 is moved from the front side past the through hole 22 up to the optical cord fixing member holding portion 222 of the rear housing 2.

Namely, it is necessary to position the optical cord fixing member 5 having the outer polygonal shape with chamfered into rounded shape at the corners, at a predetermined angular position so that the optical cord fixing member 5 can be inserted into the optical cord fixing member holding portion 222, which has the hole shape with straight cut walls on opposite sides, by only axially moving the optical cord fixing member 5.

Therefore, in order to automatically position the optical cord fixing member 5 only by inserting and moving the optical cord fixing member 5 up to the position of the optical cord fixing member holding portion 222, one pair of rotation restricting portion 224a having a tapered surface is formed for restricting rotation of the optical cord fixing member 5 in an optical cord fixing member introducing hole 224 continuous with the optical cord fixing member holding portion 222 of the rear housing 2, as shown in FIGS. 9A, 9E, 9H and so on. The restricting portion 224a continuously increases its height and restricting area toward rear side, and is continuous with the wall surface 2222 of substantially planar formed on the inner peripheral surface of the optical cord fixing member holding hole 222. The inner diameter of the optical cord fixing member introducing hole 224 is substantially the same as the circumscribing circle of the optical cord fixing member 5.

In other words, in order to automatically establish a predetermined angle only by moving the optical cord fixing member 5 to the optical cord fixing member holding portion 222, the optical cord fixing member introducing hole 224, is formed in the through hole, which is continuous with the optical cord fixing member holding portion 222 of the rear housing 2 and opposite to the optical cord insertion hole 223, as shown in FIGS. 9A and 9E. The shape of the inner peripheral surface of the optical cord fixing member introducing hole 224 is generally circular and, in greater detail, a shape for establishing continuous transition between the sectional shape 2241 having planar surfaces by cutting out one portion of the circle and the shape 2242 continuous with the circumscribing circle of the optical cord fixing member 5.

With such construction, only by an operation to relatively slide the optical cord fixing member 5 and the rear housing 2 toward each other, the optical cord fixing member 5 can be guided to the predetermined angular position for preventing rotation.

(Explanation of the Invention of Claim 6)

As shown in FIGS. 9A, 9D and so on, a plurality of projecting portions 241, which can be plastically or elastically deformed by contact (interference) with the engaging portion 511 on the outer shape (polygonal) of the optical cord fixing member 5, are formed. When the optical cord fixing member 5 is received in the optical cord fixing member holding portion 222, the projecting portions 241 are depressed by the engaging portion 511 on the outer peripheral surface of the optical cord fixing member 5 to be deformed for preventing movement, particularly forward movement, of the optical cord fixing member 5. On the other hand, when the rotation preventing structure is not provided in the optical cord fixing member holding portion 222, rotation of the optical cord fixing member 5 can be prevented by forming the projecting portion 241 into an appropriate shape.

(Explanation of Claim 7)

Figure 11A:
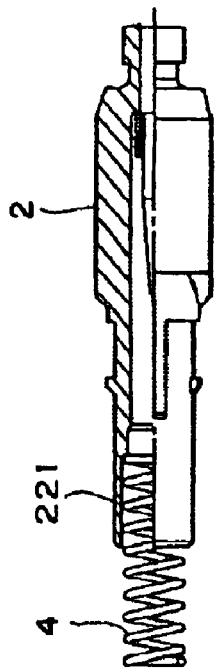
FIGS. 11A to 11C are sections showing a condition where the coil spring, the boot and so forth are assembled in the rear housing.

As shown in FIG. 9A, the shape of the inner surface of the coil spring holding portion 221 of the rear housing 2 is a circular shape having a diameter D221$i$ substantially equal to the outer diameter of the coil spring 4. By forming one or more projecting portions (not shown) performing the same function as that of the above described projecting portion 241, the coil spring 4 can be easily fixed to the rear housing 2. With the construction set forth above, as shown in FIG. 11A, when the coil spring 4 is inserted into the coil spring holding portion 221 of the rear housing 2, the coil spring 4 is fixed by the projecting portion to be integrated. With this process, the coil spring 4 which is difficult to handle, is not required to be handled as independent parts improving workability in assembling operation.

(Explanation of Claim 8)

Figure 11B:
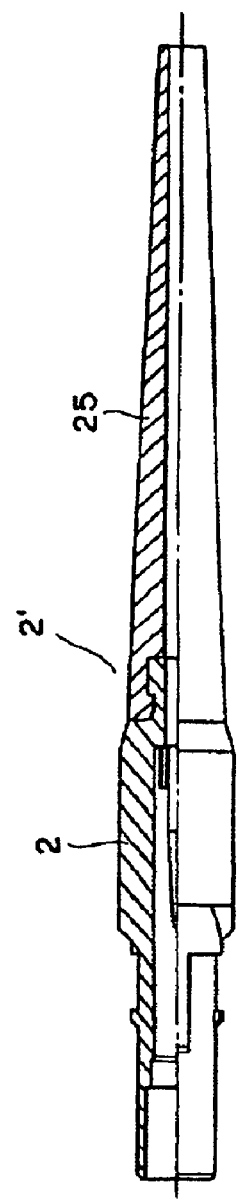
Figure 11C:
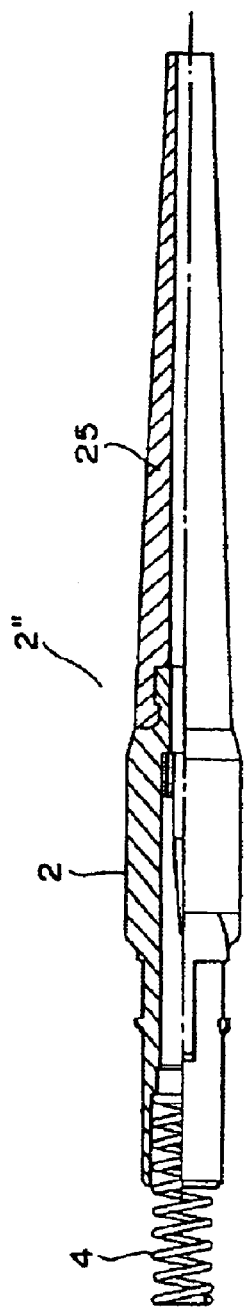

As shown in FIG. 11B, a rear housing 2' is constructed with the rear housing body 2 and the boot 25 coupled with the rear portion of the rear housing body 2, and the rear housing body 2 and the boot 25 are preliminarily assembled into an integrated sub-assembly. In comparison with the case of handling as individual parts, the sub-assembly may improve workability in assembling operation. Furthermore, as shown in FIG. 11C, by preliminarily assembling the coil spring 4 and boot 25 with the rear housing body 2, handling ability of the parts in assembling can be further improved.

It should be noted that for providing strength for the boot 25 against bending so as not to cause loss or breakage by causing excessive deflection of the optical fiber even the cord of the optical connector plug is bent, the boot 25 is formed of a relatively flexible material.

(Explanation of Claim 9)

Figure 7:
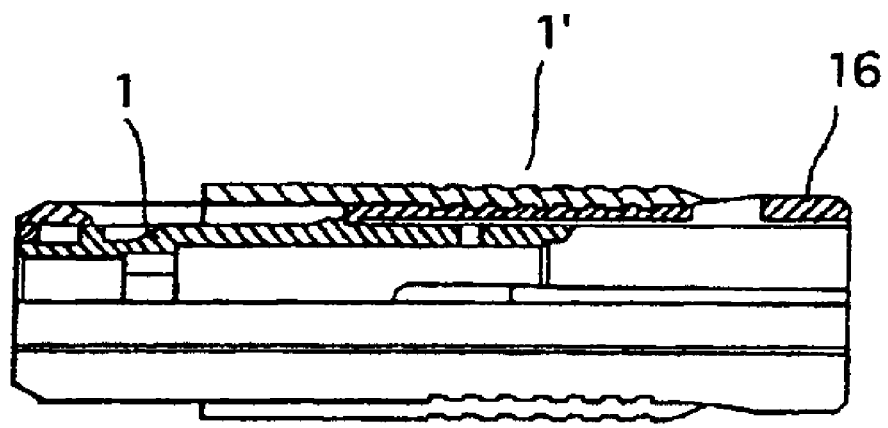
FIG. 7 is an illustration showing another embodiment of the front housing.
Figure 8A:
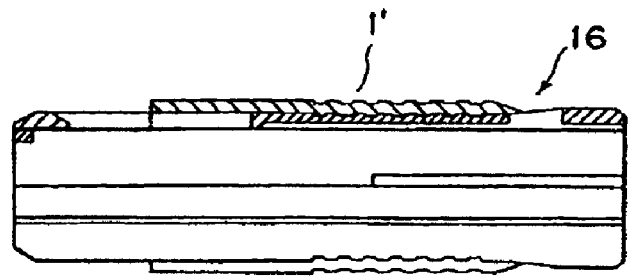
FIGS. 8A to 8D are illustrations showing greater detail of the front housing of FIG. 7.
Figure 8B:
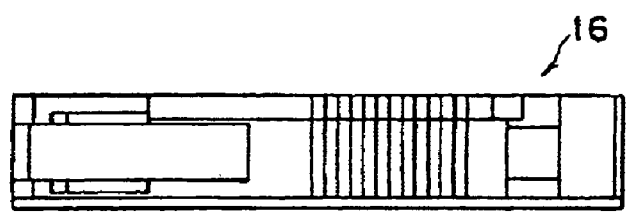
Figure 8C:
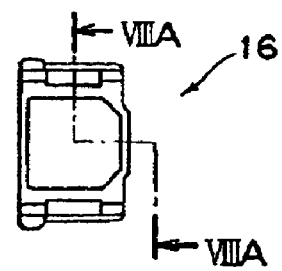
Figure 8D:
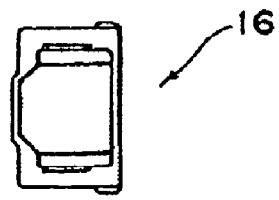

The front housings 1, 1' may have various structures adapting to the structure of the counterpart, such as an adapter or the like, to which the plug is coupled. For example, as shown in FIGS. 2, 7 and 8, the feature of the present invention will never be harmed even when the present invention is applied to the connector having a push-pull connecting structure. In this case, as shown in FIG. 7, the front housing 1' is constructed with the front housing body 1 shown in FIG. 6 and so on, and a finger grip 16 covering the front housing body 1.

On the other hand, for making assembling operation efficient, by preliminarily coupling the finger grip to the front housing body 1, these two parts are slidably integrated with each other. With such process, workability in assembling operation can be improved. It should be noted that as typically performed currently, it is also possible to maintain the front housing body 1 and the fiber grip 16 as separate parts to assemble the finger grip 16 on the front housing body 1 after completion of all other assembling steps.

(Explanation of Manufacturing Process)

Explanation will be given in connection with a manufacturing method according to the present invention will be given with reference to FIGS. 12 to 17. The optical connector plug 9 according to the present invention is an optimal structure for the manufacturing process which will be described hereinafter. By employing the structure of the optical connector plug 9 according to the present invention, the manufacturing process according to the present invention can be optimally realized.

(Explanation of Claims 15 to 17)

In the manufacturing process according to the present invention, a step of terminating the optical cord 80, a step relating to fixing of the optical cord 80, a step of fixing the coated optical fiber 85 to the ferrule 3 and, in some case, a step of polishing the ferrule, these steps requiring large amount of manual work, may be variable of order but are united into a series of steps, and steps adapted for automating, such as steps of assembling other parts and so on, are arranged before and after the united steps. Further, when the optical connector plug 9 according to the present invention is used, assembling can be basically performed by moving respective parts in an axial direction.

The preferred embodiment of the manufacturing process according to the present invention will be described in detail using FIGS. 12A to 12C, 13A to 13C, 14 and 15A to 15C.

(1) Step 1: Assembling Step of Parts to Optical Cord

Figure 12A:
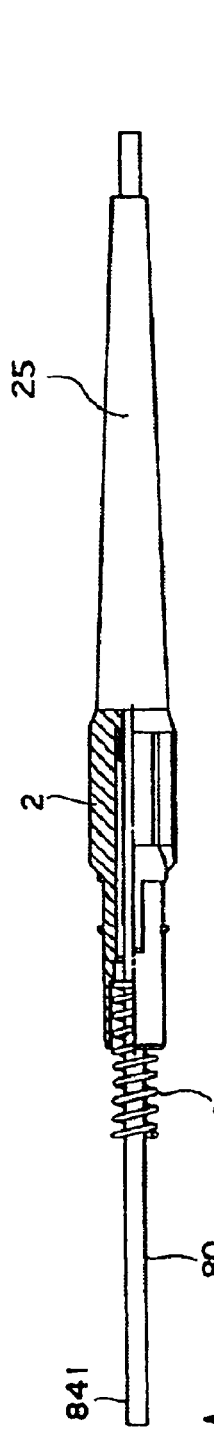
FIGS. 12A to 12C, 13A to 13C, 14 and 15A to 15C are illustrations showing process steps for explaining a manufacturing method of the optical connector plug according to the present invention.

As shown in FIG. 12A, the boot 25, the rear housing 2 and the coil spring 4 are passed through the optical cord 80 from an end 841 of the cord.

(2) Step 2: Terminating Step of Optical Cord

Figure 12B:
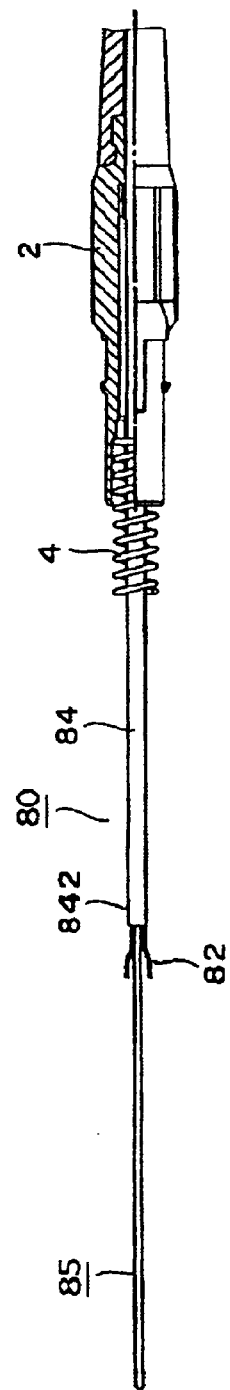

Next, as shown in FIG. 12B, the coated optical fiber 85 and the tension resistive member 82 are exposed by removing the cord outer jacket 84 of the optical cord 80 by a predetermined length. On the other hand, the tension resistive member 82 is cut into a predetermined length. Cutting of the tension resistive member 82 may be performed even at step 3 or step 4, as long as it is performed before step 5 which will be describer later.

Figure 12C:
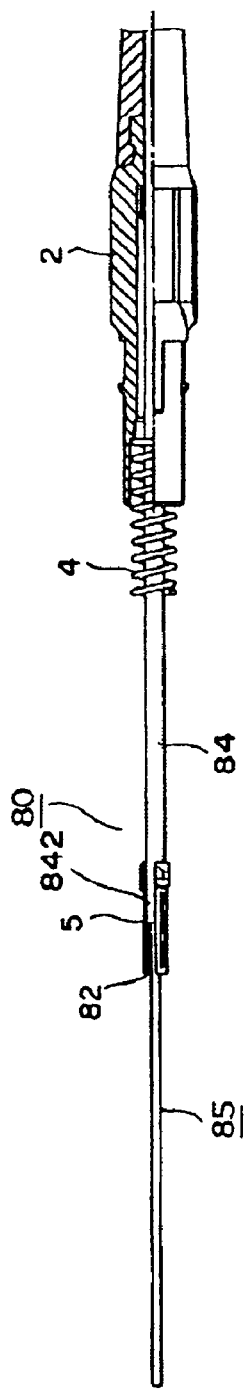

(3) Step 3: Fixing of Cord Outer Jacket 84 and Tension Resistive Member 82 onto Optical Cord Fixing Member As shown in FIG. 12C, in the embodiment set forth above, the tension resistive member 82 and the cord outer jacket 84 are fixed to the optical cord fixing member 5 at a predetermined position.

(4) Step 4: Fixing Ferrule to Optical Fiber and Terminating Process

Figure 13A:
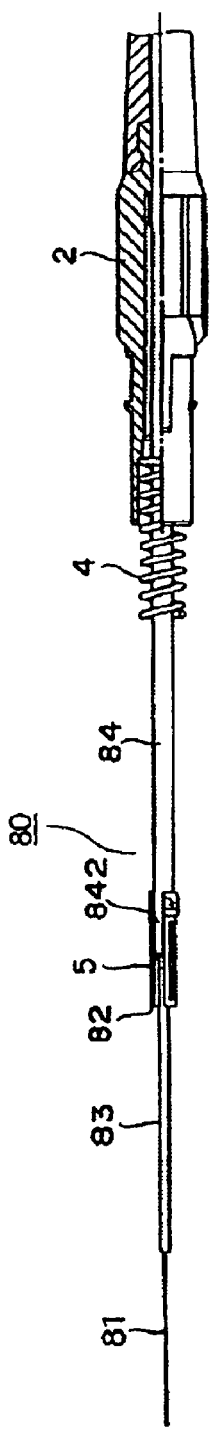
Figure 13B:
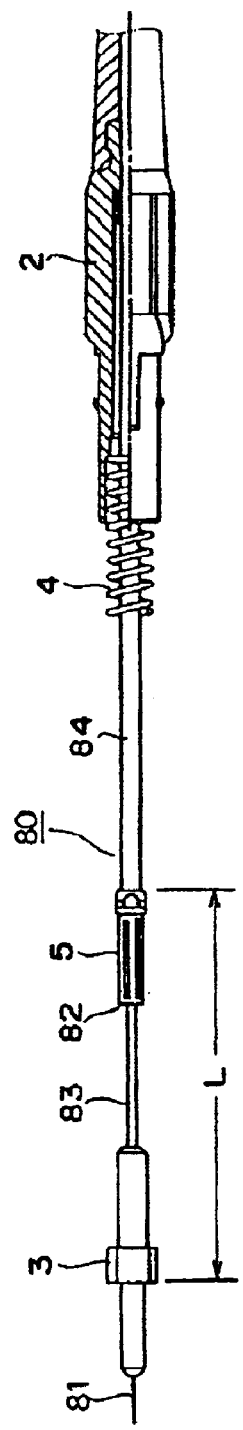

Furthermore, as shown in FIGS. 13A and 13B, the ferrule 3 is fixed to the optical fiber 81 at the tip end of the coated optical fiber 85 while the optical fiber being exposed such that a relative spaced distance with the optical cord fixing member 5 becomes a preliminarily set predetermined distance L.

Namely, the ferrule 3 is fixed to the optical fiber 81 so as to place the ferrule 3 away from the optical cord fixing member 5 by the relative spaced distance L corresponding to the conditions where the ferrule 3 and the coil spring 4 are held in the condition where the flange portion 32 of the ferrule 3 is biased frontwardly by the coil spring 4, in the through space portion 6 formed inside in the condition where the front housing 1 and the rear housing 2 are coupled to each other, and where the coil spring 4 is biased frontwardly by the coil spring abutting portion 23 of the coil spring holding portion 221 of the rear housing 2 and the optical cord fixing member 5 is held in the optical cord fixing member holding portion 222.

After thus assembling, terminating treatment, such as predetermined face polishing or the like, is performed at the tip end of the ferrule 3 depending upon desired characteristics.

Figure 13C:
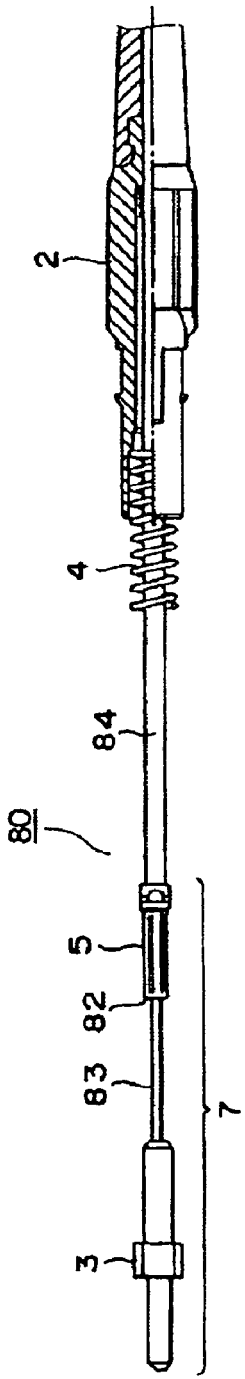

By this, as shown in FIG. 13C, a cord pre-assembly part 7 including the optical cord fixing member 5, to which the optical cord 80 and the tension resistive member 82 are fixed, and the ferrule 3, to which the optical fiber 81 is positioned and fixed, is constructed.

(5) Step 5: Final Assembling

Figure 14:
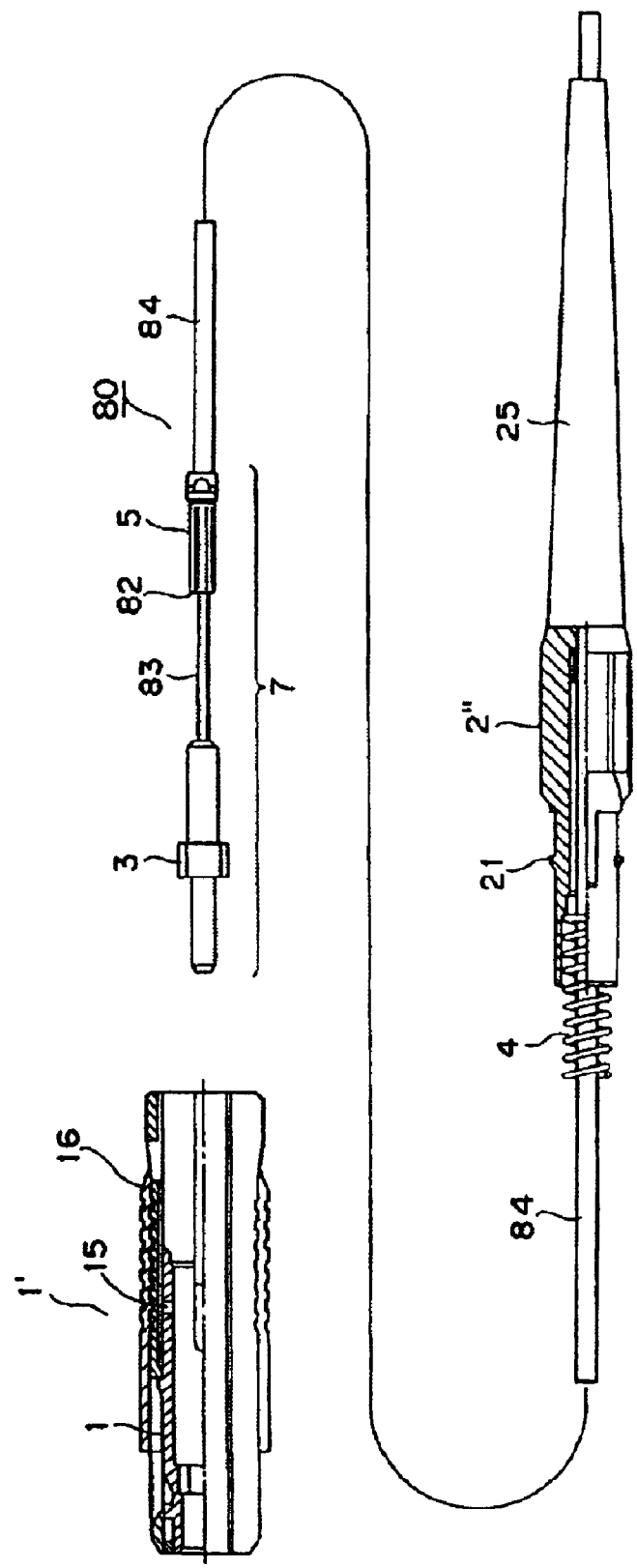
Figure 15A:
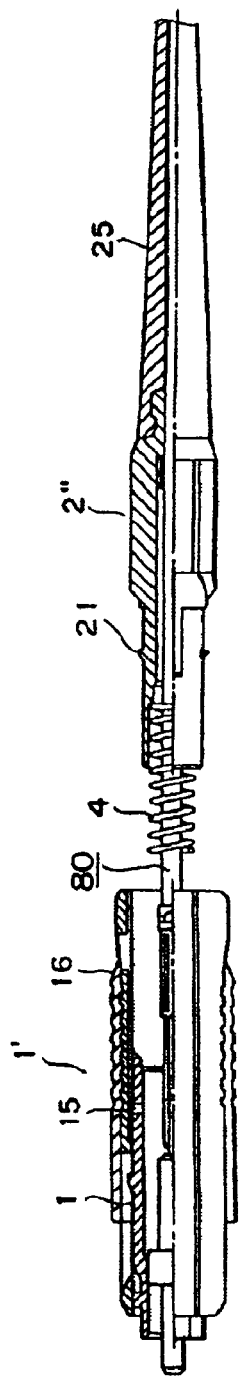

Subsequently, toward the cord pre-assembly part 7 shown in FIG. 14, the front housing 1' is moved from front side in the direction of optical axis as shown in FIG. 15A and the coil spring 4 and the rear housing 2" are moved from rear side in the direction of optical axis. Then, in the condition where the cord pre-assembly part 7 is housed, the engaging portion 15 of the front housing 1' and the engaging portion 21 of the rear housing 28 are engaged with each other for coupling the housings to complete the optical connector plug 9.

Figure 20A:
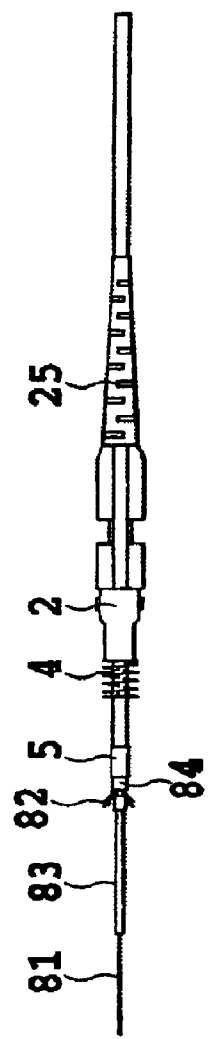
FIGS. 20A to 20E are illustrations showing one example of the manufacturing procedure of the optical connector plug according to the present invention.
Figure 20B:
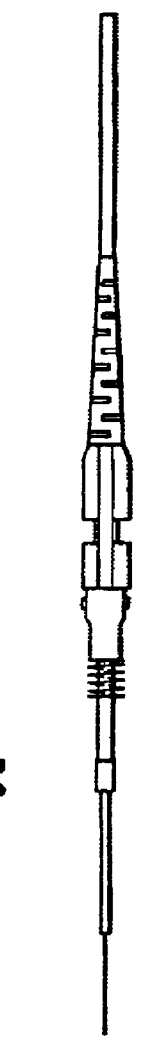
Figure 20C:
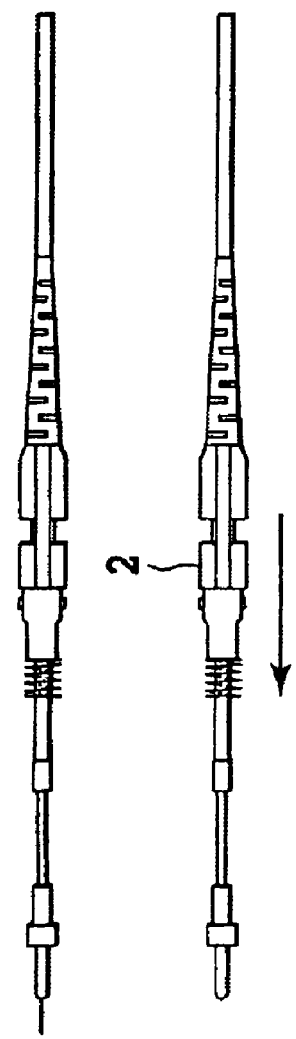
Figure 20D:
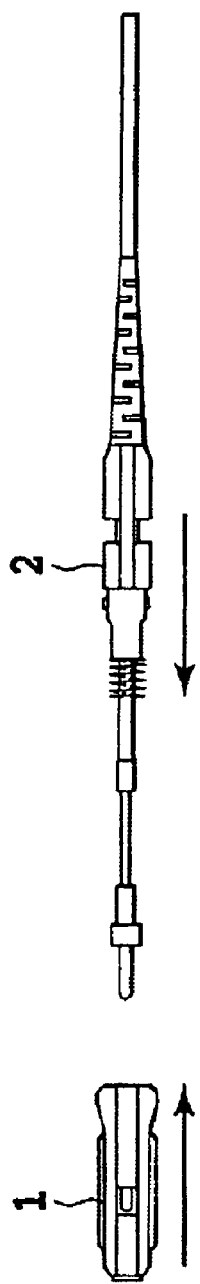

The manufacturing process set forth above is summarized in FIGS. 20A to 20E, wherein:

FIG. 20A shows treatment of the tension resistive member 82 and the cord outer jacket 84 of the optical cord;

FIG. 20B shows fixing of the tension resistive member 82 and the cord outer jacket 84 on the optical cord fixing member 5;

FIG. 20C shows bonding, fixing and polishing of the ferrule 3;

FIG. 20D shows engaging of the front housing 1 and the rear housing 2; and

Figure 20E:

FIG. 20E shows completion of the optical connector plug.

(Explanation of Claim 22)

On the other hand, at step 4 in the foregoing manufacturing process, if the relative spaced distance between the ferrule 3 and the optical cord fixing member 5 is not maintained at the preliminarily set predetermined value L, good characteristics of the assembled optical connector plug cannot be realized.

Namely, when the relative distance is shorter than the predetermined distance L, the optical cord fixing member 5 is inherently positioned toward the tip end side than the predetermined position of the optical cord fixing member holding portion 222 in the optical connector plug 9. Therefore, a play to permit the optical cord fixing member 5 to move backward within the optical cord fixing member holding portion 222 is formed. Accordingly, when the optical cord 80 is pulled backward, the optical cord fixing member 5 may be moved backward. As a result, the ferrule 3 fixed at the tip end of the coated optical fiber 85 is simultaneously pulled backward to cause disconnection to degrade characteristics.

On the other hand, if the relative distance is longer than the predetermined value L, the coated optical fiber 85 is significantly deflected within the optical connector plug 9 as assembled to cause increasing of bending loss of the optical fiber 81. In the worse case, this coated optical fiber can cause breakage of the optical fiber 81.

For this reason, in the shown embodiment, an assembling tool for fixing the ferrule and the optical cord fixing member 5 is used.

The assembling tool is an assembling tool to be used upon assembling the optical connector plug 9. The assembling tool includes a means for holding the ferrule 3, a means for holding the optical cord fixing member 5 to which the cord outer jacket 84 of the optical cord 80 and/or the tension resistive member 82 are preliminarily fixed, and an arranging means for arranging the optical cord fixing member 5, to which the optical cord 80 is fixed, and the ferrule, in a predetermined positional relationship when the optical fiber 81 at the tip end of the optical cord 80 fixed to the optical cord fixing member 5 is fixed to the ferrule 3.

The arranging means fixes the ferrule 3 to the optical fiber 81 so as to place the ferrule 3 away from the optical cord fixing member 5 by the relative spaced distance L corresponding to the conditions where the ferrule 3 and the coil spring 4 are held in the condition where the flange portion 32 of the ferrule 3 is biased frontwardly by the coil spring 4, in the through space portion 6 formed inside in the condition where the front housing 1 and the rear housing 2 are coupled to each other, and where the coil spring 4 is biased frontwardly by the coil spring abutting portion 23 of the coil spring holding portion 221 of the rear housing 2 and the optical cord fixing member 5 is held in the optical cord fixing member holding portion 222.

One example of such an assembling tool is illustrated in FIG. 21.

The assembling tool can easily fix the ferrule 3 at the position distanced from the optical cord fixing member 5 preliminarily fixed to the optical cord 80 by the relative distance L.

The assembling tool includes an optical cord fixing member holding jig 210 to hold the optical cord fixing member 5, to which the tension resistive member 82 and the cord outer jacket 84 of the optical cord 80 are fixed, a ferrule holding jig 220 to hold the ferrule 3, and a positioning base for positioning the optical cord fixing member holding jig 210 and the ferrule holding jig 220 so as to be distanced by a predetermined distance.

In the optical cord fixing member holding jig 210, a recessed portion 211 receiving the coated optical fiber 85, a recessed portion 212 receiving the optical cord fixing member 5 and a recessed portion 213 receiving the optical cord 80 are formed. At a boundary between the recessed portion 211 and 212 and a boundary between the recessed portion 212 and 213, stepped portions 214 and 215 are formed, respectively, for restricting movement of the optical cord fixing member 5 in back and forth directions.

In the ferrule holding jig 220, a recessed portion 226 with a stepped portion 225 is formed for restricting backward movement of the flange portion 32 of the ferrule. Within the recessed portion 226, the ferrule 3 is received and held.

The foregoing two jigs 210 and 220 are fixed to the positioning base 200. It should be noted that a dimension, such as a distance between the stepped portion 214 and the stepped portion 225 and so on is set such that the ferrule 3 and the optical cord fixing member 5 are distanced by the relative distance L when the optical cord fixing member 5 is received within the recessed portion 212 and the flange portion 32 of the ferrule 3 is restricted backward movement by the stepped portion 225.

Figure 21A:
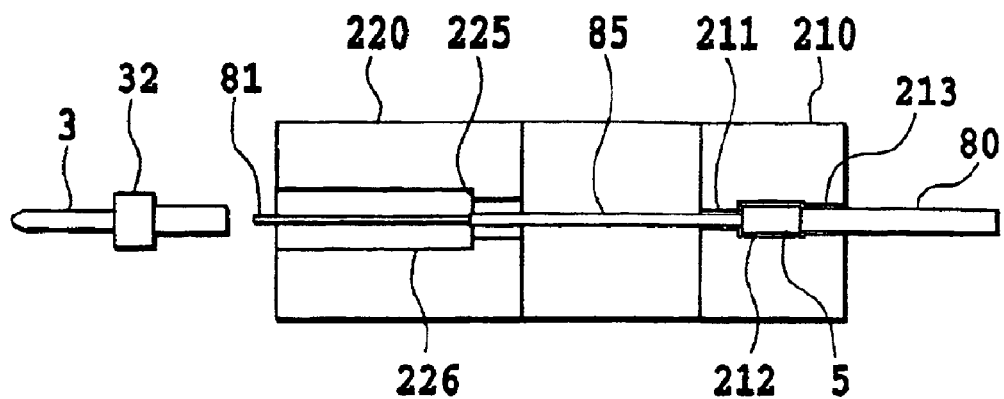
FIGS. 21A and 21B are illustrations showing one embodiment of an assembling tool to be employed upon assembling the optical connector plug according to the present invention.

In this assembling tool, at first, as shown in FIG. 21A, the optical cord 80 is set in the jigs 210 and 220 such that the cord outer jacket 84 and the tension resistive member 82 of the optical cord 80 are fixed by the optical cord fixing member 5, and the optical cord fixing member 5 is received and held in the recessed portion 212 of the jig 210.

Figure 21B:
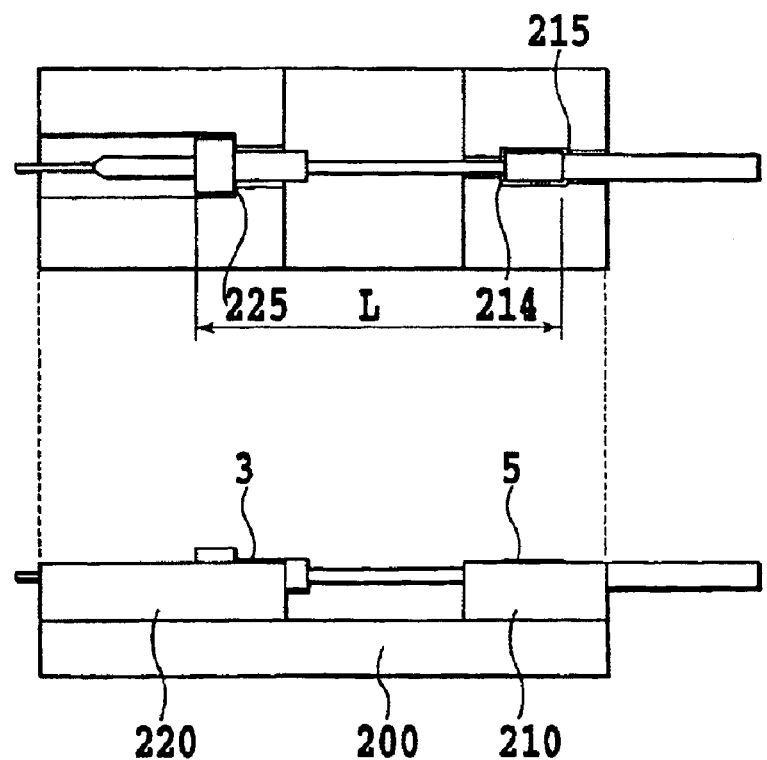

Next, as shown in FIG. 21B, passing the ferrule 3 through the tip end of the exposed optical fiber 81 of the optical cord 80, positioning the ferrule 3 such that the flange portion 32 is abutted against the stepped portion 225 of the jig 220, and then the optical fiber 81 is adhered and fixed to the ferrule 3.

By using such a tool, the ferrule 3 can be fixed to the optical fiber 81 in spaced apart from the optical cord fixing member 5 by the predetermined distance L. Then, by such an assembling tool, a step of measuring the relative distance between the ferrule 3 and the optical cord fixing member 5 and so on can be eliminated to economically realize the assembling steps.

(Explanation of Claims 18 to 21)

In the foregoing manufacturing process, a similar effect can be obtained even when order of step 3 and step 4 is changed. In this case, however, the positional relationship of the ferrule 3 and the optical cord fixing member 5 is defined at step 4' where the optical cord fixing member 5 is assembled. With reference to FIGS. 16 and 17 as well, manufacturing method in the case where the order of steps 3 and 4 are switched will be explained.

(1) Step 1: Assembling Step of Parts to Optical Cord 80

As shown in FIG. 12A, the rear housing 2 and the coil spring 4 are passed through the optical cord 80 from an end 841 of the cord.

(2) Step 2': Terminating Process of Optical Cord 80

Figure 16A:
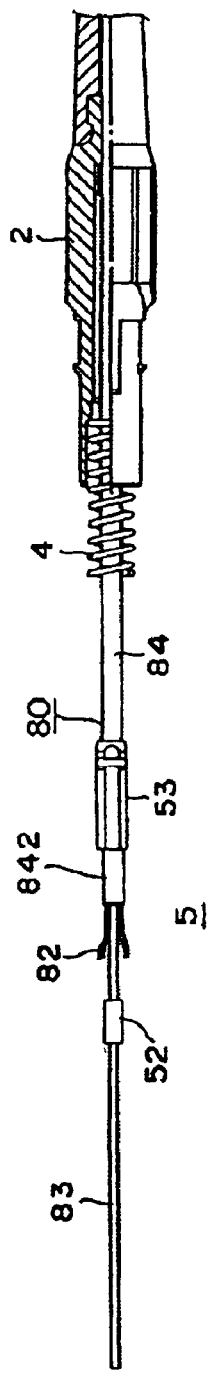
FIGS. 16A to 16C and 17 are illustrations showing process steps for explaining another embodiment of the manufacturing method of the optical connector plug according to the present invention.
Figure 16B:
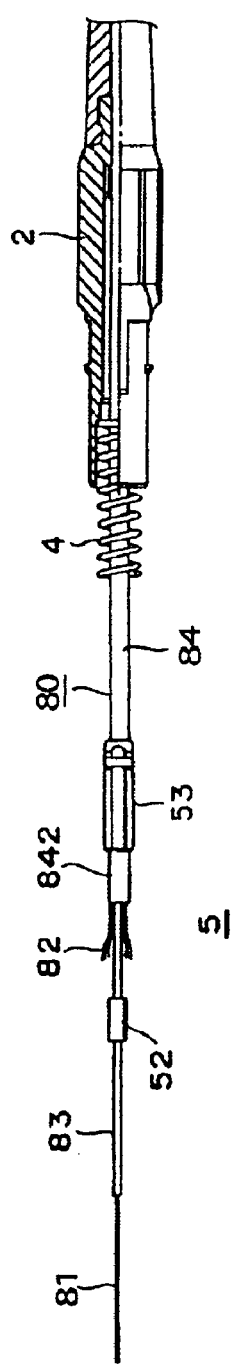
Figure 16C:
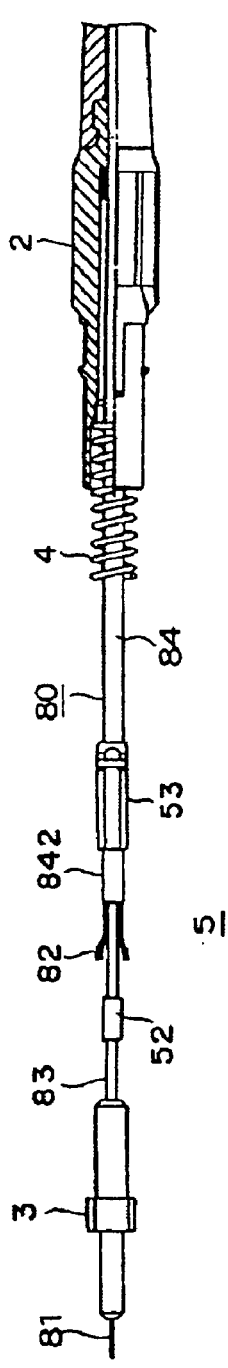
Figure 17:
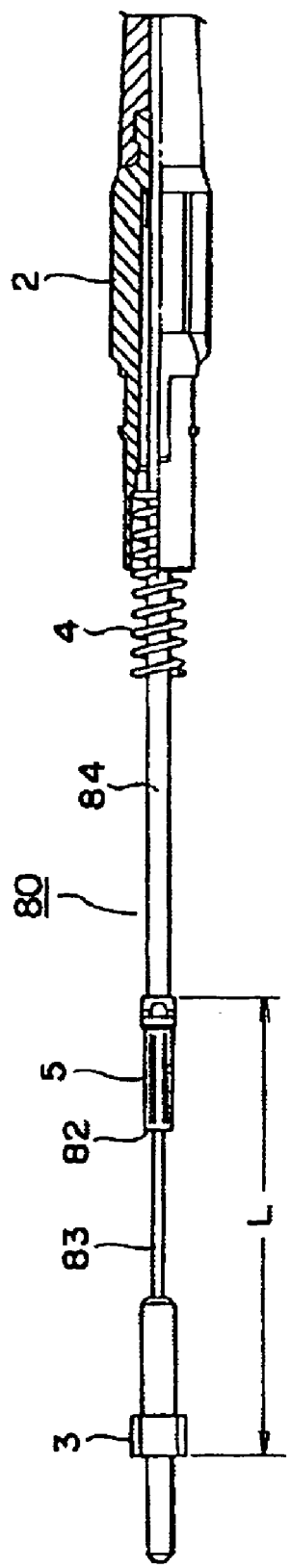

As shown in FIG. 16A, the optical cord fixing member 5 is arranged, and as shown in FIG. 16B, the coated optical fiber 85 and the tension resistive member 82 are exposed by removing the cord outer jacket 84 of the optical cord 80 by a predetermined length. Also, the optical fiber 81 at the tip end is exposed by removing the optical fiber coat 83. On the other hand, the tension resistive member 82 is cut into the predetermined length. Cutting of the tension resistive member 82 may be performed even at step 3' or step 4', as long as it is performed before step 5 which will be describer later (3) Step 3': Fixing of Ferrule 3 to Optical Fiber 81 and Terminating Treatment As shown in FIG. 16C, the ferrule 3 is fixed to the tip end of the optical fiber 81. Then, terminating treatment, such as predetermined face polishing or the like, is provided at the tip end of the ferrule 3 depending upon desired characteristics.

(4) Step 4': Fixing of Cord outer jacket 84 and Tension Resistive Member 82 onto Optical Cord Fixing Member 5

As shown in FIG. 17, the tension resistive member 82 and the cord outer jacket 84 are fixed to the optical cord fixing member 5 such that the relative spaced distance between the ferrule 3 fixed at step 3' and the optical cord fixing member 5 becomes the predetermined distance L.

Namely, the ferrule 3 and the coil spring 4 are held in the condition where the flange portion 32 of the ferrule 3 is biased frontwardly by the coil spring 4, in the through space portion 6 formed inside in the condition where the front housing 1 and the rear housing 2 are coupled with each other. the tension resistive member 82 and the cord outer jacket 84 are fixed by the optical cord fixing member 5 such that the optical cord fixing member 5 is placed away from the ferrule 3 by the relative spaced distance L corresponding to the conditions where the ferrule 3 and the coil spring 4 are held in the condition where the flange portion 32 of the ferrule 3 is biased frontwardly by the coil spring 4, in the through space portion 6 formed inside in the condition where the front housing 1 and the rear housing 2 are coupled to each other, and where the coil spring 4 is biased frontwardly by the coil spring abutting portion 23 of the coil spring holding portion 221 of the rear housing 2 and the optical cord fixing member 5 is held in the optical cord fixing member holding portion 222.

In this manner, as shown in FIG. 13C, a cord pre-assembly part 7 including the optical cord fixing member 5, to which the cord outer jacket 84 and the tension resistive member 82 are fixed, and the ferrule 3, to which the coated optical fiber 85 is positioned and fixed, is constructed.

(5) Step 5: Final Assembling

Subsequently, toward the cord pre-assembly part 7 shown in FIG. 14, the front housing 1' is moved from front side in the direction of optical axis as shown in FIG. 15A and the coil spring 4 and the rear housing 2" are moved from rear side in the direction of optical axis. Then, in the condition where the cord pre-assembly part 7 is housed, the engaging portion 15 of the front housing 1' and the engaging portion 21 of the rear housing 2" are engaged with each other for coupling the housings to complete the optical connector plug 9.

It should be noted that the terminating process, such as polishing of the end face of the ferrule and so on can be performed at somewhere in the process for forming the cord pre-assembly part 7. Other than the process set forth above, it can be performed after fixing the ferrule 3 and the optical cord fixing member 5, or, in the alternative, it can be performed at arbitrary steps before step 5.

In either case, when parts other than those set out in connection with the foregoing steps, such as a finger grip, a cap and so on, are to be assembled, those parts are assembled at step 5, as a matter of course.

(Explanation of Claim 23)

At step 4' in the manufacturing process, if the relative spaced distance between the ferrule 3 and the optical cord fixing member 5 is not maintained at the predetermined value L, good characteristics of the assembled optical connector plug cannot be realized as already mentioned.

Therefore, in the shown embodiment, the following assembling tool is employed.

The assembling tool is an assembling tool to be used upon assembling the optical connector plug 9 and includes a means for holding the ferrule 3, to which the coated optical fiber 85 is preliminarily fixed, a means for holding the optical cord fixing member 5 located at the rear end of the ferrule 3 and passed through the optical cord 80, and an arranging means for arranging the ferrule 3 fixed thereto the coated optical fiber 85 and the optical cord fixing member 5 to establish the predetermined positional relationship when the cord outer jacket 84 of the optical cord 80 and/or the tension resistive member 82 are fixed to the optical cord fixing member 5.

The arranging means fixes the tension resistive member 82 and the cord outer jacket 84 by the optical cord fixing member 5 such that the optical cord fixing member 5 is placed away from the ferrule 3 by the relative spaced distance L corresponding to the conditions where the ferrule 3 and the coil spring 4 are held in the condition where the flange portion 32 of the ferrule 3 is biased frontwardly by the coil spring 4, in the through space portion 6 formed inside in the condition where the front housing 1 and the rear housing 2 are coupled to each other, and where the coil spring 4 is biased frontwardly by the coil spring abutting portion 23 of the coil spring holding portion 221 of the rear housing 2 and the optical cord fixing member 5 is held in the optical cord fixing member holding portion 222. One example of such an assembling tool is illustrated in FIG. 22.

The assembling tool can easily fix the optical cord fixing member 5 at a position distanced from the ferrule 3 preliminarily fixed to the optical fiber 81 by the relative distance L.

In this case, as the optical cord fixing member 5, the clamp seat 52 and the clamp ring 53 shown in FIG. 5 are used.

The assembling tool has a ferrule holding jig 230 to hold the ferrule 3 fixed to the optical fiber 81, an optical cord holding base 240 to hold the optical cord 80, and a sliding member 270 movable on a jig base 260 through a guide rail 250 and formed with a recessed portion 271 for holding the coated optical fiber 85. The sliding member 270 serves as a member for holding and positioning the optical cord fixing member 5.

In the ferrule holding jig 230, a recessed portion 231 corresponding to the shape of the ferrule 3 is formed for restricting movement of the ferrule 3 in back and forth directions.

In the sliding member 270, an extending portion 272 extending in the optical axis direction of the optical cord 80 is formed. Dimensions, relative distances and so on are set so that the optical cord fixing member 5 contacted with the sliding member 270 and the ferrule 3 held by the ferrule holding jig 230 are spaced apart by the predetermined distance L when the sliding member 270 is moved until the tip end of the extending portion 272 abuts to the optical cord holding base 240.

Figure 22A:
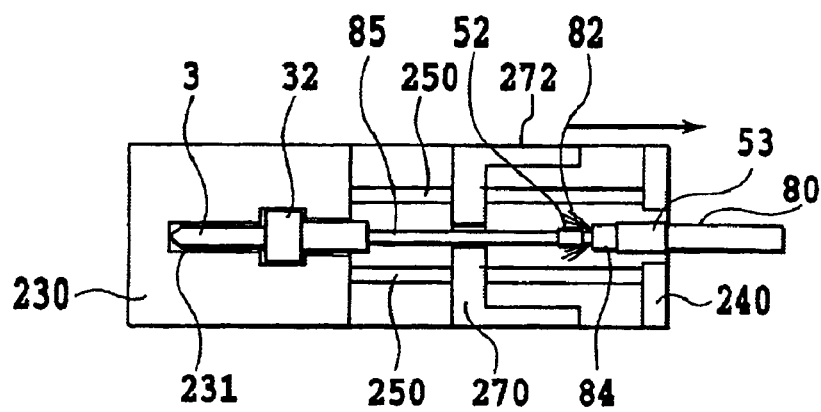
FIGS. 22A and 22B are illustrations showing another embodiment of the assembling tool to be employed upon assembling the optical connector plug according to the present invention.

In this assembling tool, at first, as shown in FIG. 22A, the ferrule 3, to which the optical fiber 81 is fixed, is set in the ferrule holding jig 230.

Figure 22B:
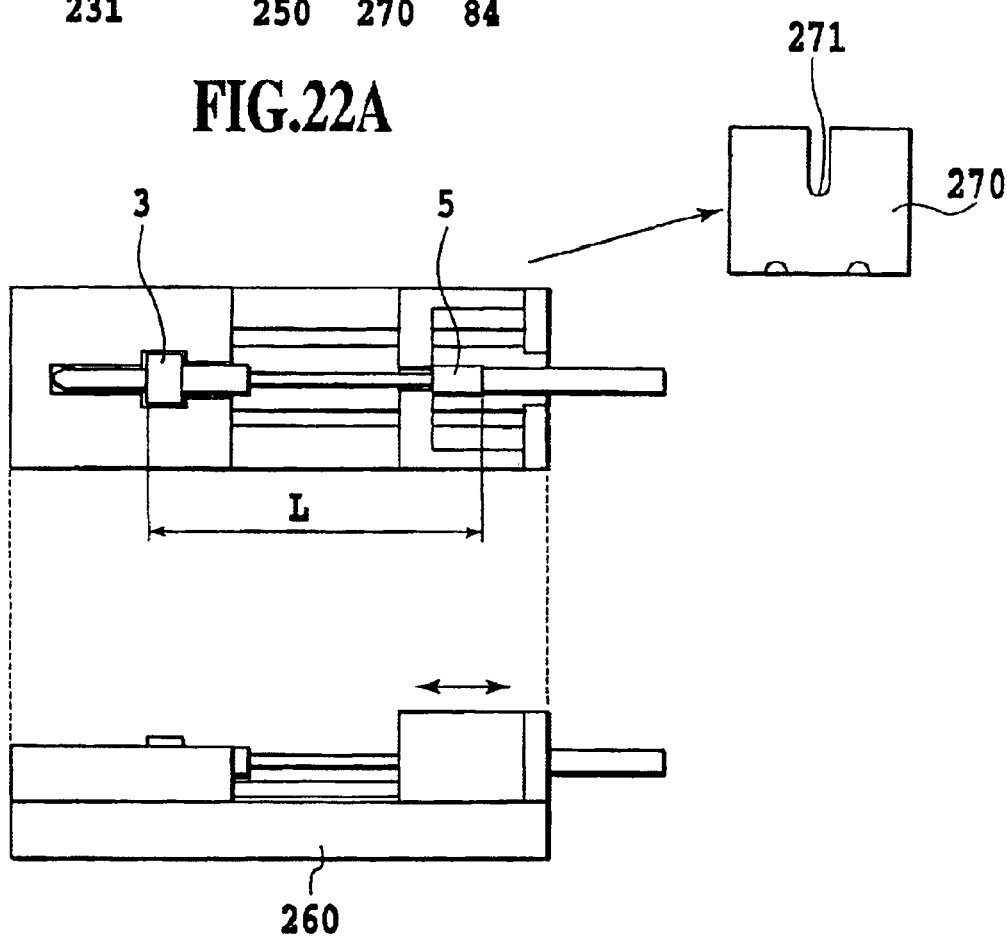
Figure 23A:
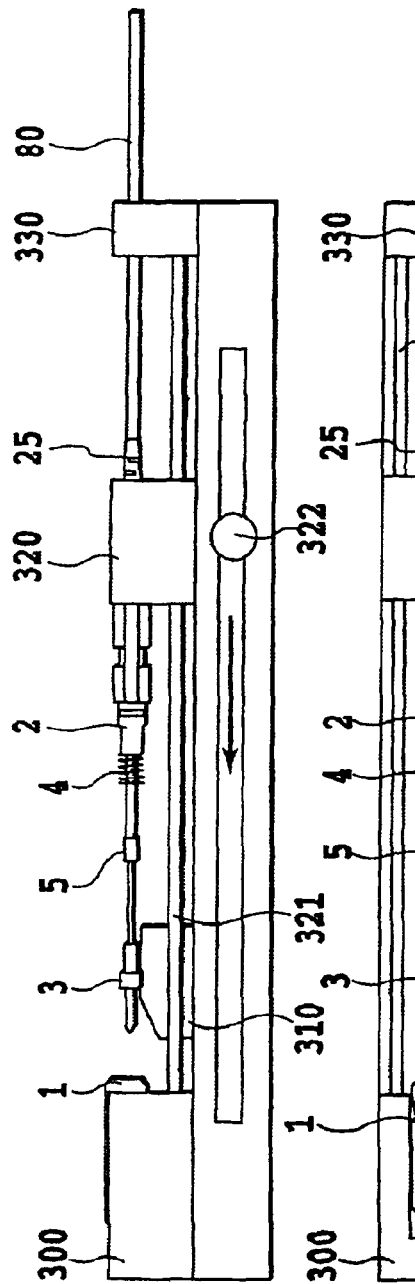
FIGS. 23A to 23D are illustrations showing a further embodiment of the assembling tool to be employed upon assembling the optical connector plug according to the present invention.
Figure 23B:
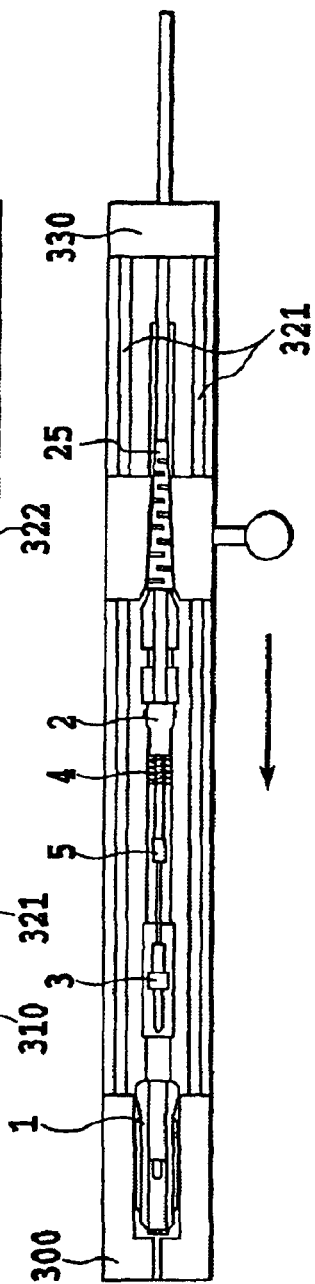
Figure 23C:
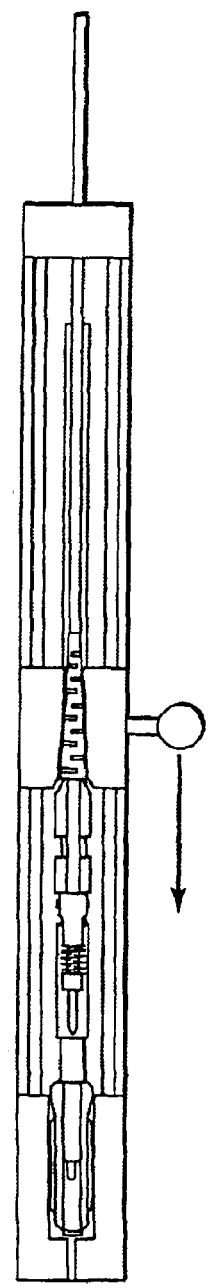
Figure 23D:
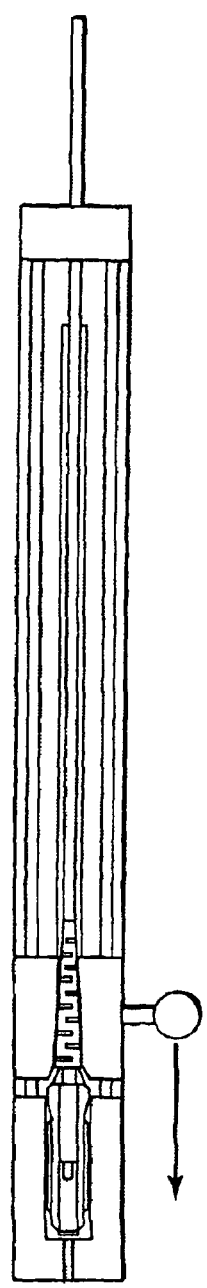

Next, as shown in FIG. 22B, the sliding member 270 is moved to the position abutting the extending portion 272 thereof to the optical cord holding base 240. At this condition, the optical cord fixing member 5 is urged onto the wall surface of the sliding member 270. At this condition, the optical cord fixing member 5 is fixed to the optical cord 80 by clamping.

(Explanation of Claim 24)

Figure 15B:
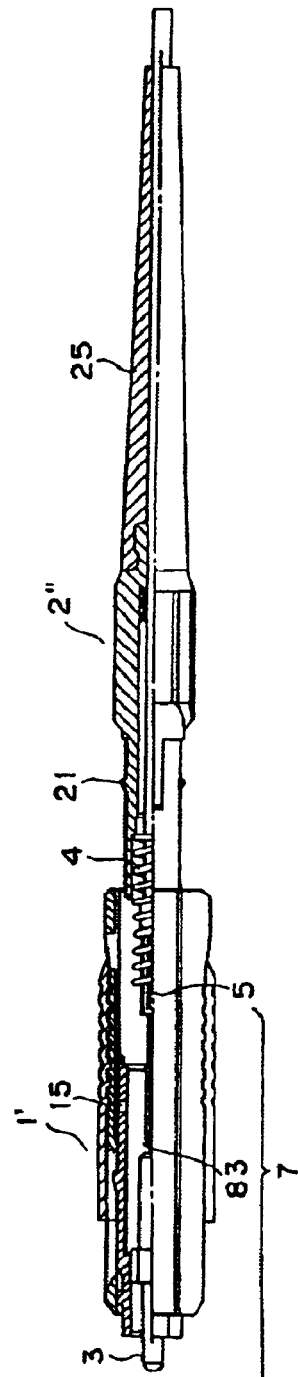
Figure 15C:
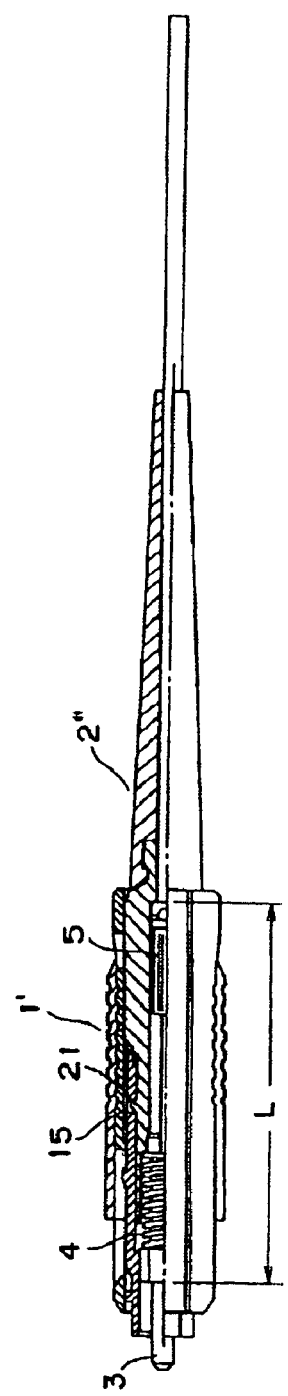

As shown in FIGS. 14, 15A and 15B, upon moving the front housing 1 from front side in the optical axis direction toward the cord pre-assembly part 7 and moving the coil spring 4 and the rear housing 2 from rear side in the optical axis direction, and thus assembling the housings by engagement of the engaging portion 15 of the front housing 1 and the engaging portion 21 of the rear housing 2 with accommodating the cord pre-assembly part 7, when the coil spring 4 of the rear housing 2 abuts on the flange portion 32 of the ferrule 3 of the cord pre-assembly part 7, the ferrule 3 is biased by the coil spring 4 to be possibly moved frontward. Also, the optical cord fixing member 5 can also be moved frontward within the rear housing 2 as biased frontward.

Particularly, in the case of the structure where the engaging portion 24 of the optical cord fixing member holding portion 222 and the engaging portion 511 of the optical cord fixing member 5 interfere with each other to be fixed by causing plastic deformation upon arranging and fixing the optical cord fixing member 5 to the optical cord fixing member holding portion 222 of the rear housing 2, relatively greater force may be exerted on the optical cord fixing member 5 according to progress of movement of the rear housing 2 toward the optical cord fixing member 5.

Due to this, it may occur that the relative position between the ferrule 3 and the optical cord fixing member 5 can not be maintained. On the other hand, it is also possible that the optical cord fixing member 5 can not be arranged and engaged with the predetermined position of the engaging portion 24 of the optical cord fixing member holding portion 222.

In order to avoid this, the rear end side of the optical cord 80 is held so as not to change the relative spaced distance L between the ferrule 3 and the optical cord fixing member 5.

As set forth above, in the optical connector plug 9, prevention of rotation of the optical cord 80 is realized by engaging the optical cord fixing member 5 with the engaging portion 24 of the optical cord fixing member holding portion 222. Therefore, it becomes necessary to certainly hold the optical cord fixing member 5 at the rear end portion inside the rear housing 2. For this purpose, upon engaging the front housing 1 and the rear housing 2, the optical cord 80 has to be held with a predetermined resistance.

Therefore, the following assembling tool is used.

The assembling tool has a means for holding the front housing 1 assembled with the ferrule 3 with maintaining the relative distance L with the ferrule 3 after assembling at least the ferrule 3 in the front housing 1 and arranging the flange portion 32 of the ferrule 3 on a flange holding portion 13 of the front housing 1, upon moving the front housing 1 from front side in the optical axis direction toward the cord pre-assembly part 7 and moving the coil spring 4 and the rear housing 2 from rear side in the optical axis direction, and thus assembling the housings by engagement of the engaging portion of the front housing 1 and the engaging portion of the rear housing with accommodating the cord pre-assembly part 7 and whereby assembling the optical connector plug, a means for holding the rear end side of the optical cord 80 so as not to vary the relative position with the ferrule 3, and a means for holding the rear housing in axially movable fashion with respect to these parts.

One example of such an assembling tool is illustrated in FIGS. 23A to 23D.

The assembling tool comprises a front housing holding member 300 for holding and fixing the front housing 1, a ferrule holding member 310 for holding the ferrule 3, a rear housing holding member 320 for holding the rear housing 2, and a frictional resistance member 330 for applying a predetermined frictional resistance on the optical cord 80. The rear housing holding member 320 is movable along a guide rail 321. The rear housing holding member 320 may be manually movable by means of a lever 322, or may be movable by an appropriate drive mechanism employing a motor and the like.

Before using this assembling tool, the cord pre-assembly part 7 (the ferrule 3 and the optical cord fixing member 5) is fixed to the tip end for assembling the optical cord 80, through which the rear housing 2, the coil spring 4, the boot 25 and so on as integrated, are inserted the optical cord 80.

Then, the ferrule 3 of the optical cord 80 assembled with these parts is placed on the ferrule holding member 310. The rear housing 2 (the boot 25, in this case) is held in the rear housing holding member 320. Furthermore, the optical cord 80 behind the rear housing 2 is set in the frictional resistance member 330. On the other hand, the front housing 1 is set in the front housing holding member 300.

In such condition, the rear housing holding member 320 is moved frontward to couple the rear housing 2 to the front housing 1. Upon moving the rear housing holding member 320 frontward, a given frictional resistance is applied on the optical cord 80 by the frictional resistance member 330, the cord pre-assembly part 7 is certainly set at the predetermined positions in the front housing 1 and the rear housing 2.

It should be noted that, in the foregoing example, the ferrule 3 is held by the ferrule holding member 310, however, it is also possible to hold the optical cord fixing member 5. In the alternative, it is also possible to hold both of the ferrule 3 and the optical cord fixing member 5.

By employing such assembling tool, even when the rear housing 2 is moved frontward to be engaged with the front housing 1, the relative position between the front housing 1 and the ferrule 3 and the cord rear end do not vary, and maintained at the predetermined position.

Moreover, the optical cord fixing member 5, to which optical cord 80 is fixed, also does not move since the cord is held on the rear end side thereof, so that the relative position between the front housing and the ferrule is maintained.

By using such assembling tool, it is possible to fix the front housing 1 and the rear housing 2 to each other while maintaining the ferrule 3 and the optical cord fixing member 5 at predetermined relative positions. By this, for example, it can be avoided to cause breakage of the optical fiber by deflecting the optical cord 80 within the housing, and it becomes possible to arrange and fix the optical cord fixing member 5 at the predetermined position of the fixing member holding portion 222 within the rear housing 2.

(Explanation of Claim 25)

On the other hand, as shown in FIGS. 14, 15A and 15B, when the engaging portion 15 of the front housing 1 and the engaging portion 21 of the rear housing 2 are engaged to assemble the housings with accommodating therein the cord pre-assembly part 7 by moving the front housing 1 from front side in the optical axis direction toward the cord pre-assembly part 7 and by moving the coil spring 4 and the rear housing 2 from rear side in the optical axis direction, the flange portion 32 of the ferrule 3 of the cord pre-assembly part 7 is arranged at the predetermined position of the flange holding portion 13 of the front housing 1, and after arranging, the relative position of the ferrule 3 and the front housing 1 has to be maintained.

When these components are not arranged at the predetermined positions, or the arrangement of the ferrule 3 and the optical cord fixing member 5 is varied during coupling of the front housing 1 and the rear housing 2 even if the ferrule 3 is arranged at the predetermined position within the front housing 1, the ferrule 3 and the optical cord fixing member 5 are not placed at the predetermined relative position as the front housing 1 and the rear housing 2 are coupled, possibly causing breakage of the optical fiber due to deflection of the optical cord 80 within the housing.

In order to avoid this, it is necessary to maintain the ferrule 3 within the front housing 1 so as not to vary the relative distance L between the ferrule 3 and the optical cord fixing member 5 after the front housing 1 is moved from front side toward the cord pre-assembly part 7 to accommodate the ferrule 3 of the cord pre-assembly part 7 within the front housing 1. By this, upon assembling the rear housing 2 from the rear side later, it may be possible to complete the coupling of the front housing 1 and the rear housing 2 without varying the relative position between the ferrule 3 and the optical cord fixing member 5.

At this time, in order to assemble the housing efficiently, an assembling tool for arranging and holding the ferrule 3 at the predetermined position of the front housing 1 is employed.

The assembling tool has a means for holding the ferrule 3 upon assembling the housings by moving the front housing 1 from front side in the optical axis direction and moving the coil spring 4 and the rear housing 2 from the rear side in the optical axis direction for engaging the engaging portion 15 of the front housing 1 and the engaging portion 21 of the rear housing 2 with accommodating the cord pre-assembly part 7, namely upon assembling the ferrule 3 of the cord pre-assembly part 7 within the front housing 1 by moving the front housing 1 from front side toward the cord pre-assembly part 7, a means for holding the front housing 1, a means for arranging the flange portion 32 of the ferrule 3 at the predetermined position of the front housing 1, namely on the flange holding portion 13, and a means for maintaining this condition so that the relative position of the ferrule 3 and the front housing 1 is maintained unchanged.

By this, upon coupling the front housing 1 and the rear housing 2, the ferrule 3 and the optical cord fixing member 5 can be arranged at the predetermined relative position so as to avoid a possibility of causing breakage of the optical fiber due to deflection of the optical cord 80 within the housing.

One example of the assembling tool is illustrated with reference to FIGS. 24A to 24D.

In the assembling tool shown in FIGS. 23A to 23D set forth above, the rear housing holding member 320 is moved frontward to couple the rear housing 2 to the front housing 1. In contrast to this, in the assembling tool shown in FIGS. 24A to 24D the front housing 1 is moved backwardly to couple the front housing 1 to the rear housing 2.

As shown in FIGS. 24A to 24D, the assembling tool comprises a front housing holding member 400 for holding and fixing the front housing 1, a ferrule holding member 410 for holding the ferrule 3, a rear housing holding member 420 for holding the rear housing 2, and a cord pulling member 430 for applying a predetermined tension force on the optical cord 80 backward to move the optical cord 80 backward. The front housing holding member 400 is reciprocally movable along a guide rail 401. In this case, the front housing holding member 400 is manually moved by means of a lever 402. The rear housing holding member 420 restricts backward movement of the rear housing 2. In the shown embodiment, the cord pulling member 430 is constructed with a pair of pulleys and a mechanism for rotating the pulleys.

Before using this assembling tool, at first, the optical cord 80, to which the cord pre-assembly part 7 (the ferrule 3 and the optical cord fixing member 5) is fixed at the tip end, and extending through the rear housing 2, the coil spring 4 and the boot 25, which are integrated, is assembled.

The ferrule 3 of the optical cord 80 assembled with these parts, is placed on the ferrule holding member 410. The rear housing 2 (boot 25, in this case) is held on the rear housing holding member 420. Also, the optical cord 80 on the rear side of the rear housing 2 is set on the tensioning member 430. On the other hand, the front housing 1 is set on the front housing holding member 400.

In such a condition, the front housing holding member 400 is moved backwardly, and in conjunction therewith, the optical cord 80 is moved backward by the cord pulling member 430 to couple the rear housing 2 to the front housing 1. With such assembling tool, upon movement of the front housing holding member 400 backward, the optical cord 80, the ferrule 3 and the optical cord fixing member 5 connected to the optical cord 80 are moved backward with the predetermined tension being applied. Therefore, the cord pre-assembly part 7 is certainly set at the predetermined position of the front housing 1 and the rear housing 2.

It should be noted that, in the foregoing embodiment, although the ferrule 3 is held by the ferrule holding member 410, it is also possible to hold the optical cord fixing member 5, or, in the alternative, to hold both of the ferrule 3 and the optical cord fixing member 5.

(Other Assembling Tool)

Figure 25:
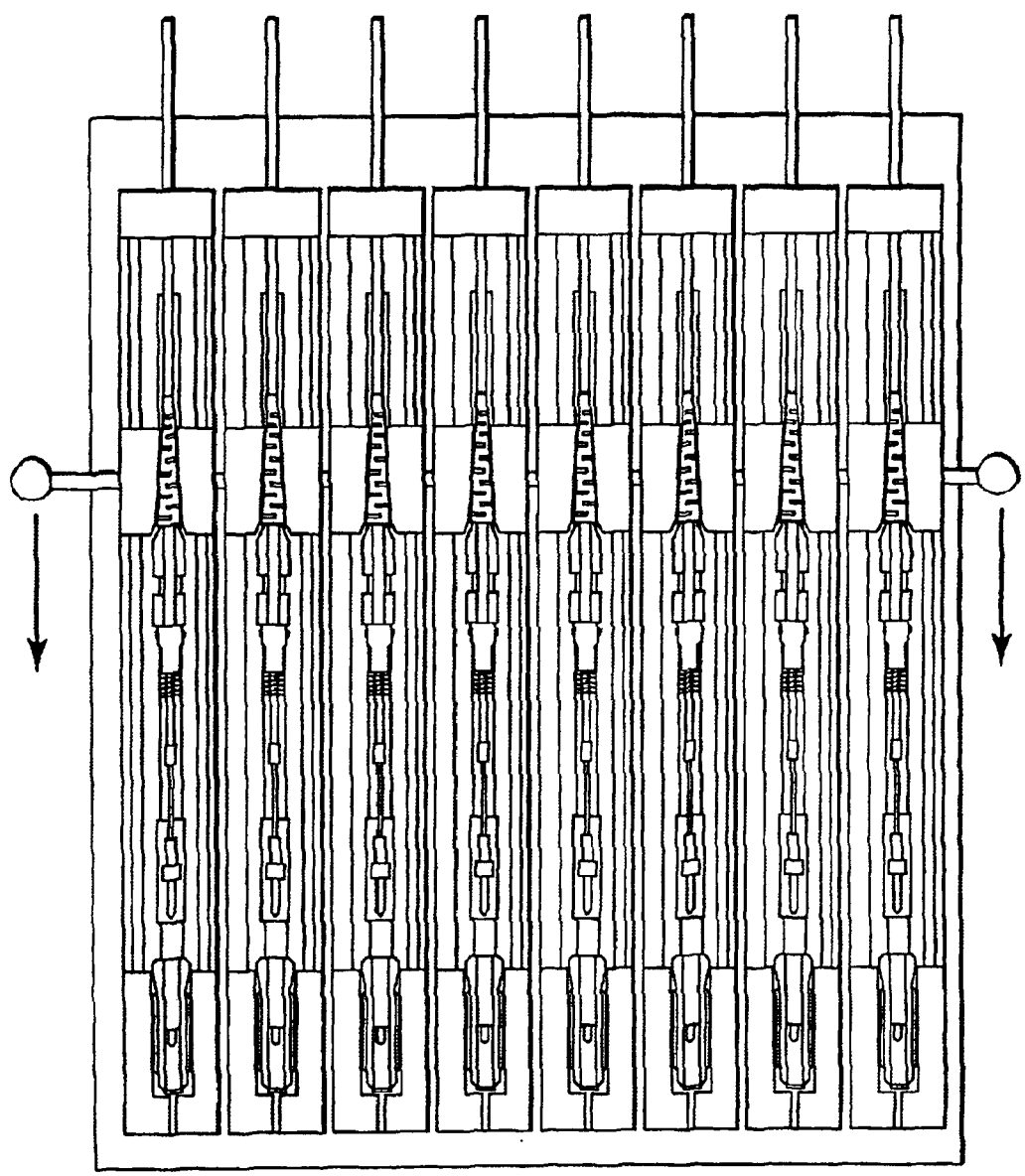
FIG. 25 is an illustration showing a yet further embodiment of the assembling tool to be employed upon assembling the optical connector plug according to the present invention.

FIG. 25 shows an embodiment, in which a plurality of assembling tools shown in FIGS. 23A to 23D are arranged. With such assembling tool, a plurality of connectors are assembled simultaneously to make optical connector assembling process significantly economical.

It should be noted that a plurality of the assembling tools shown in FIGS. 21A, 21B, FIGS. 22A, 22B and FIGS. 24A to 24D may also be arranged together.

(Effect of Embodiments)

As set forth above, with the shown embodiment of the optical connector plug or the manufacturing method, the terminating step of the optical cord requiring manpower, the fixing step of the optical cord and the fixing step of fixing the optical fiber to the ferrule can be united into a series of steps even though order of the steps is variable. Therefore, automating of assembling of the optical connector plug which has been relatively difficult, can be easily realized to make assembling of the optical connector plug efficient.

On the other hand, in assembling of the optical connector plug 9, operation associated with assembling can be realized with simple operation, namely substantially back and forth movement of the parts along an optical axis direction. Therefore, assembling can be realized by a relatively simple automatic assembling machine to facilitate easy automation.

Furthermore, in a conventional way, when the cord outer jacket 84 or the tension resistive member 82 are fixed by clamping, it is a typical method to cover the tension resistive member or the cord outer jacket with the clamping member and then secure, after placing the tension resistive member and/or the cord outer jacket along the outer peripheral portion of the connector housing. In this case, the portion of the housing for fixing the tension resistive member and/or the cord outer jacket has to withstand against the clamping force. Therefore, the connector housing per se is frequently formed of metal.

In contrast to this, in the shown embodiments, fixing of the cord outer jacket and the tension resistive member can be realized by the optical cord fixing member as a individual member independent of the housing body (the front housing and the rear housing). Therefore, in the present embodiments, the force by clamping is not exerted on the housing to realize production of the housing body portion requiring a complicate shape by molding of plastic or the like. Therefore, cost for the parts can be lowered.

On the other hand, since the optical cord fixing member 5 has a quite simple construction, it can be realized at low cost. Furthermore, since the optical cord fixing member 5 may be inserted through the coil spring 4, it becomes possible to move the coil spring 4 back and forth in the direction of the optical axis of the optical cord fixing member 5 after assembling the optical cord 80 on the optical cord fixing member 5. By this, the optical cord 80 can be fixed before arranging the coil spring 4 at the predetermined position.

On the other hand, as a plug structure for automating or simplification of assembling, there exists a structure, in which the coil spring is built in the ferrule, or a structure, in which the coil spring and the ferrule are built in the housing. Here, upon fixing the optical fiber on the ferrule, an adhesive is normally used. However, in the case of the optical connector with the simplified construction as above, it may happen that the optical cord and/or the tension resistive member are fixed to the housing or the like by adhesive in the condition where the coil spring is built in the ferrule or in the condition where the coil spring and the ferrule are built in the housing. Accordingly, in the case of such simplified plug, careful attention is required so that the adhesive will not adhere on members other than the ferrule or members other than those for fixing the tension resistive member. Therefore, in many cases, such application is realized by means of a micro dispenser or special adhesive application member for applying adhesive. When the adhesive adhere on the parts other than the ferrule or the like, various operational failures can be caused.

To the contrary, in the embodiments of the optical connector plug, it is possible to easily bond the ferrule by adhesive since the construction is employed wherein fixing of the ferrule to the optical fiber can be performed in the condition where the ferrule and the optical fiber are distant from other parts or other parts are not present.

Furthermore, when the optical cord fixing member is constructed with a clamping seat and a clamp ring, the clamping seat can be a cylindrical part of metal or the like. Also, the clamp ring may also be substantially cylindrical metal parts. Thus, these parts can be realized at low cost. In addition, since the tension resistive member and the optical cord outer jacket are firmly fixed, a highly reliable optical connector can be provided. Furthermore, fixing by clamping of the cord outer jacket and the tension resistive member using these can be quite simply performed by placing the tension resistive member along the tension resistive member fixing portion on the outer surface of the clamp seat and fixing the tension resistive member and the cord outer jacket by clamping the clamp ring after fitting the clamp ring.

Furthermore, since the rotation preventing structure is provided between the optical cord fixing member and the rear housing, even if the optical cord is twisted, for example, the rotation is prevented for avoiding rotation of the optical cord within the optical connector plug to cause twisting and so on resulting in breakage of the optical fiber or other failure. Therefore, highly reliable optical connector plug can be provided.

Since the tapered guide wall surface is provided, on the inner surface of the rear housing, for guiding the optical cord fixing member to be placed at a predetermined angular position for preventing rotation of the optical cord fixing member, the optical cord fixing member can be guided to the predetermined angular position for preventing the optical cord fixing member only by operation to relatively move the optical cord fixing member and the rear housing forward in the direction of optical axis. This operation can be completed only by relatively moving the optical cord fixing member and the rear housing in the direction of optical axis, a high workability is achieved and automating can be facilitated.

On the other hand, one or more protecting portions are provided on the inner peripheral surface of the optical cord fixing member holding portion of the rear housing for fixing the optical cord fixing member on the rear housing by plastic deformation of the projecting portion caused by depression force from the outer surface of the optical cord fixing member when the optical cord fixing member is received within the optical cord fixing member holding portion. Therefore, the optical cord fixing member can be arranged and held at the predetermined position in the rear housing only by relatively moving the optical cord fixing member and the rear housing in optical axis direction.

Furthermore, since the shape of the inner peripheral surface of the coil spring holding portion of the rear housing is substantially similar to the outer shape of the coil spring and has the projecting portion to cause plastic deformation by contacting with the coil spring at least in part, by preliminarily integrating the rear housing and the coil spring by inserting the coil spring in the coil spring holding portion of the rear housing, the coil spring and the rear housing can be handled as one part to permit reduction of number of parts in assembling and simplification of assembling. Also, it becomes possible to handle the coil spring which is difficult to handle for small size and resiliency together with the rear housing which is easier to handle for relatively large size. It is advantageous to handle the coil spring and the rear housing together since reduction of number of parts in assembling is desirable in automating and thus facilitate automating.

Furthermore, so as not to cause loss or breakage of the optical fiber due to excessive bending even when the cord of the optical connector plug is bent, it is typical to form the boot with a material which can be relatively easily bent, in order to provide sufficient strength against bending. With this invention, the rear housing is constructed with a rear housing body and a boot coupled to the rear portion of the rear housing body, and takes a construction, in which the rear housing body and the boot are preliminarily integrated to permit handling of these rear housing body and the boot together so as not to cause degradation of characteristics against bending with eliminating work load for assembling the boot and thus facilitates automating.

On the other hand, in the conventional connector, the front housing is constructed with at least the front housing body and the finger grip covering the front housing body. By preliminarily integrating the front housing body and the finger grip in a slidable fashion, number of parts in assembling can be reduced and assembling operation can be simplified. Furthermore, automating is facilitated.

It should be noted that the present invention is applicable even for the SC type optical connector. On the other hand, while the optical connector plug for the single core optical fiber has been illustrated in the foregoing embodiments, the present invention is of course applicable for an optical fiber of multiple core type. It is not always necessary that the ferrule has a circular cross section, but can be of arbitrary shape, such as polygon shape, elliptic shape, rectangular shape and so on. Also, sectional shapes of the front housing 1, the rear housing 2, the coil spring 4, the optical cord fixing member 5 and so on may be arbitrary selected as long as not departing from the principle of the present invention.

On the other hand, in the shown embodiment, the optical fiber positioning and fixing portion 31 is constructed to fix the optical fiber by adhesive or bond. However, the optical fiber may be fixed by arbitrarily selected any known method.

Furthermore, while the shown embodiment is directed to the optical connector plug connecting the optical cord including the tension resistive member, the cord outer jacket, the optical fiber coat and the optical fiber, the present invention is equally applicable upon terminating an optical cord which does not have the tension resistive member and the outer jacket or sheath.

INDUSTRIAL APPLICABILITY

As set forth above, the optical connector plug according to the present invention is useful for terminating the optical cord having the optical fiber, the coated optical fiber having the optical fiber coat covering the optical fiber, the cord outer jacket covering the coated optical fiber and the tension resistive member disposed between the coated optical fiber and the cord outer jacket, which is easy to assemble and adapted for automating.

What is claimed is:

1. An optical connector plug, comprising:

a front housing, a rear housing to be coupled with said front housing, a ferrule, a coil spring, and an optical cord fixing member, and connecting an optical cord including a coated optical fiber having an optical fiber and an optical fiber coat covering the optical fiber, a cord outer jacket further covering said coated optical fiber and a tension resistive member disposed between said coated optical fiber and said cord outer jacket, wherein said ferrule has an optical fiber positioning and fixing portion for positioning and fixing the optical fiber at a tip end of the coated optical fiber of said optical cord and a flange portion contacting with said coil spring and biased thereby, wherein said coil spring has a tip end portion for contacting with said flange portion of said ferrule and biasing the latter, and a rear end portion for contacting with said rear housing, said coil spring having predetermined inner and outer diameters, wherein said optical cord fixing member has an outer diameter capable of insertion into said coil spring and an inner diameter permitting insertion of said optical cord, when said optical cord is fixed thereto, and engaging means for engaging with said rear housing at least on a part of an outer peripheral surface, wherein said front housing includes engaging means for engaging with said rear housing, and a first through hole, said first through hole comprising a tip end side hole portion having an inner diameter greater than an outer diameter of said optical fiber positioning and fixing portion of said ferrule, an intermediate hole portion continuous with said tip end side hole portion, and having a flange portion holding portion for restricting frontward movement of the flange portion of said ferrule and receiving said flange portion, and a rear side hole portion having an inner diameter greater than an outer diameter of said coil spring, wherein said rear housing includes engaging means for engaging with said engaging means of said front housing by relatively moving said rear housing and said front housing toward each other, and a second through hole, on a rear end side of said second through hole, an optical cord inserting hole having an inner diameter permitting insertion of said optical cord but not permitting insertion of said optical cord fixing member is formed, in front of said optical cord insertion hole, an optical cord fixing member holding hole having fixing means for fixing said optical cord fixing member and receiving said optical cord fixing member is formed continuous with said optical cord insertion hole, on a tip end side of said second through hole, a coil spring holding portion for holding said coil spring and biasing the rear end of said coil spring is formed, and between said coil spring holding portion and said optical cord fixing member holding hole, an optical cord fixing member introducing hole for permitting insertion of said optical cord fixing member is formed, wherein in a condition where said front housing and said rear housing are coupled with each other, a through space portion is defined therein, and wherein said ferrule, said coil spring and said optical cord fixing member are received within said through space portion such that said ferrule is held in a condition where a tip end of said optical fiber positioning and fixing portion of said ferrule, to which the optical fiber of said optical cord is fixed, is extended from the tip end of said front housing, said flange portion is restricted forward movement by the flange portion holding portion of the front housing and is biased frontward by said coil spring, said coil spring is biased frontward by the coil spring holding portion of said rear housing, and said optical cord fixing member, to which said optical cord is fixed, is fixed and held by said optical cord fixing member holding hole of said rear housing.

2. An optical connector plug as claimed in claim 1, wherein said optical cord fixing member has a clamp seat and a clamp ring, said clamp seat is a member having a through hole having an inscribing circle greater than the outer diameter of said coated optical fiber and being formed with a tension resistance member fixing portion, said clamp ring is a member having a through hole with an inscribing circle greater than an outer diameter of said tension resistive member fixing portion of said clamp seat, and being formed with a tension resistive member fixing portion and a cord outer jacket fixing portion therein, after passing said coated optical fiber through said clamp seat and shifting the clamp seat to an end portion of exposed cord outer jacket, by placing an exposed tension resistive member along said tension resistive member fixing portion of said clamp seat, fitting said clamp ring over said clamp seat, along which said tension resistive member is placed, and the end portion of said cord outer jacket so as to cover them, and then clamping said tension resistive member fixing portion and said cord outer jacket fixing portion of said clamp ring, said tension resistive member and said cord outer jacket is fixed to said clamp seat and said clamp ring.

3. An optical connector plug as claimed in claim 1, wherein a fixing portion for fixing the tension resistive member by bonding is formed on the outer peripheral portion of said optical cord fixing member, and said tension resistive member is fixed to said optical cord fixing member by an adhesive.

4. An optical connector plug as claimed in claim 1, wherein at least a part of said optical cord fixing member has a polygonal outer shape in section with a chamfered round corner, and a rotation preventing structure is formed in such a manner that at least a part of a receiving portion for said optical cord fixing member is said rear housing as a part of an inner shape of said optical cord fixing member holding portion of said rear housing has a substantially circular sectional shape of substantially the same size as a circumscribing circle of the polygonal optical cord fixing member with the chamfered round corner and more specifically has a surface by cutting out a part of said substantially circular shape so as to hold the optical cord fixing member to be rotatable within a predetermined angular range.

5. An optical connector plug as claimed in claim 1, wherein a fixing member rotation restricting portion for restricting a rotation of the optical cord fixing member is provided in a through hole portion on opposite side of the through hole to the optical cord insertion hole, the through hole being communicated with said optical cord fixing member holding portion of said rear housing, said fixing member rotation restricting portion has a substantially circular inner shape with a surface cut out partially on the rear end side and an inner shape continuous with the circumscribing circle of said optical cord fixing member on the tip end side, and an inner shape at an intermediate portion located between the rear end side and the tip end side is a shape forming transition between two inner shapes.

6. An optical connector plug as claimed in claim 1, wherein a projecting portion is provided on the inner peripheral surface of the optical cord fixing member holding portion of the rear housing, when the optical cord fixing member is received within the hole of the optical cord fixing member holding portion, the optical cord fixing member is fixed in the rear housing by interference caused between said projecting portion and an outer peripheral surface of said optical cord fixing member.

7. An optical connector plug as claimed in claim 1, wherein a shape of an inner peripheral surface of the coil spring holding portion of said rear housing is substantially the same as a shape of the outer shape of said coil spring, and a projecting portion is provided on the inner peripheral surface for fixing said coil spring in the rear housing by interference between the outer surface of said coil spring and said projecting portion when said coil spring is received within said coil spring holding portion.

8. An optical connector plug as claimed in claim 1, wherein engaging means of said rear housing and said front housing is a structure formed with a cantilever provided in one of said rear and front housings and including an engaging projection at a tip end thereof, and an engaging hole provided in the other of said rear and front housings and adapted to receive said engaging projection.

9. An optical connector plug as claimed in claim 1, wherein said rear housing includes a rear housing body and a boot to be coupled with a rear portion of said rear housing body, and said rear housing body and said boot are preliminary integrated with each other.

10. An optical connector plug as claimed in claim 1, wherein said front housing is formed with a front housing body and a finger grip covering the front housing body, and said front housing body and said finger grip are preliminarily integrated in a slidable fashion.

11. An optical connector plug as claimed in claim 1, wherein said optical cord fixing member is a member having a circumscribing circle smaller than an inner diameter of said coil spring at least after assembling said optical cord and said tension resistive member and said cord outer jacket are fixed to said optical cord fixing member.

12. An optical connector plug as claimed in claim 1, wherein said optical cord fixing member has a substantially polygonal shape in section, a substantially planar wall surface for restricting rotation of said polygonal shape optical cord fixing member is formed at one or more positions on the inner peripheral surface of the hole of said optical cord fixing member holding portion of said rear housing.

13. An optical connector plug as claimed in claim 12, a rotation restricting portion for restricting rotation of said optical cord fixing member is formed on an inner peripheral surface of a portion continuous with said optical cord fixing member holding portion in said optical cord fixing member introducing hole of said rear housing, said restricting portion continuously increases in height and restricting area toward rearward, and continuous with the substantially planar wall surface formed on the inner peripheral surface of the hole of said optical cord fixing member holding portion.

14. A manufacturing method of an optical connector plug for connecting the optical connector plug with an optical cord including a coated optical fiber having an optical fiber and an optical fiber coat covering the optical fiber, a cord outer jacket further covering the coated optical fiber and a tension resistive member disposed between said coated optical fiber and said cord outer jacket, said method comprising:

a first step of passing said optical cord through a rear housing and a coil spring;

a second step of exposing the coated optical fiber and the tension resistive member at an end portion of said optical cord;

a third step of fixing an optical cord fixing member to said optical cord by fixing said tension resistive member and said cord outer jacket by said optical cord fixing member;

a fourth step of forming a cord pre-assembly part, in which said optical cord fixing member and a ferrule are fixed, by fixing said ferrule to a tip end of said coated optical fiber such that a relative spaced distance to said fixed optical cord fixing member becomes a preliminarily set predetermined distance; and a fifth step of coupling a front housing and the rear housing by movement in back and forth directions for accommodating said cord pre-assembly part and said coil spring.

15. A manufacturing method of an optical connector plug as claimed in claim 14, wherein in said fourth step, said ferrule is fixed to the tip end of said coated optical fiber such that said ferrule is spaced apart from the optical cord fixing member by a relative spaced distance corresponding to that in a condition where said ferrule and said coil spring is held within a through space portion defined inside when said front housing and said rear housing are coupled, with a flange portion of said ferrule being biased frontward by said coil spring, and said optical cord fixing member is held within an optical cord fixing member holding hole of said rear housing with said coil spring being biased frontward by the coil spring holding portion of said rear housing.

16. A manufacturing method of an optical connector plug as claimed in claim 14, wherein, in said fourth step, a process including face polishing of an end face of said spring.

17. A manufacturing method of an optical connector plug for connecting the optical connector plug with an optical cord including a coated optical fiber having an optical fiber and an optical fiber coat covering the optical fiber, a cord outer jacket further covering the coated optical fiber and a tension resistive member disposed between said coated optical fiber and said cord outer jacket, said method comprising:

a first step of passing said optical cord through a rear housing and a coil spring;

a second step of exposing the coated optical fiber and the tension resistive member at an end portion of said optical cord;

a third step of fixing a ferrule at a tip end of the coated optical fiber;

a fourth step of forming a cord pre-assembly part, in which an optical cord fixing member and the ferrule are fixed, by fixing an optical cord fixing member to said optical cord by fixing said tension resistive member and said cord outer jacket by said optical cord fixing member such that a relative spaced distance to said fixed ferrule becomes a preliminarily set predetermined distance; and a fifth step of coupling a front housing and the rear housing by movement in back and forth directions for accommodating said cord pre-assembly part and said coil spring.

18. A manufacturing method of an optical connector plug as claimed in claim 17, wherein in said fourth step, said ferrule is fixed to the tip end of said coated optical fiber such that said ferrule is spaced apart from the optical cord fixing member by a relative spaced distance corresponding to that in a condition where said ferrule and said coil spring is held within a through space portion defined inside when said front housing and said rear housing are coupled, with a flange portion of said ferrule being biased frontward by said coil spring, and said optical cord fixing member is held within an optical cord fixing member holding hole of said rear housing with said coil spring being biased frontward by the coil spring holding portion of said rear housing.

19. A manufacturing method of an optical connector plug as claimed in claim 18, wherein, in said fourth step, a process including face polishing of an end face of said ferrule is performed.

20. A manufacturing method of an optical connector plug as claimed in claim 17, wherein, in said third step, a process including face polishing of an end face of said ferrule is performed.

21. An assembling tool of an optical connector plug for use upon fixing a ferrule and an optical cord fixing member to an optical cord including a coated optical fiber having an optical fiber and an optical fiber coat covering the optical fiber, a cord outer jacket further covering the coated optical fiber and a tension resistive member disposed between said coated optical fiber and said cord outer jacket, such that said ferrule and said optical cord fixing member are spaced apart by a predetermined distance, said assembling tool comprising:

optical cord fixing member holding means for detachably holding said optical cord fixing member fixing the tension resistive member and the cord outer jacket of said optical cord and further limiting forward and backward movement of said optical cord fixing member thus held;

ferrule holding means for positioning and detachably holding said ferrule so that said ferrule is spaced apart from said optical cord fixing member held by said optical cord fixing member holding means by a distance corresponding to said predetermined distance; and positioning means for holding said optical cord fixing member holding means and said ferrule holding means and further adjusting a position of said ferrule holding means relative to said optical cord fixing member holding means in back and forth directions;

wherein said optical fiber of said optical cord is fixed by bonding to said ferrule held by said ferrule holding means.

22. An assembling tool of an optical connector plug for use upon fixing a ferrule and an optical cord fixing member to an optical cord including a coated optical fiber having an optical fiber and an optical fiber coat covering the optical fiber, a cord outer jacket further covering the coated optical fiber and a tension resistive member disposed between said coated optical fiber and said cord outer jacket, such that said ferrule and said optical cord fixing member are spaced apart by a predetermined distance, said assembling tool comprising:

ferrule holding means for detachably holding the ferrule to which the optical fiber of said optical cord is fixed by bonding and further limiting forward and backward movement of said ferrule holding means thus held;

optical cord fixing member holding means for positioning and detachably holding said optical cord fixing member so that said optical cord fixing member is spaced apart from said ferrule held by said ferrule holding means by a distance corresponding to said predetermined distance; and positioning means for holding said optical cord fixing member holding means and said ferrule holding member and further adjusting a position of said optical cord fixing member holding means relative to said ferrule holding means in back and forth directions;

wherein said optical cord fixing member holding means is slid rearward to move said optical cord holding means, thereby positioning said optical cord fixing means, and said tension resistive member and said cord outer jacket of said optical cord is processed to be fixed to said optical cord fixing member detachably held by said optical cord fixing member holding means.

23. An assembling tool of an optical connector plug for use upon assembling said optical connector plug with an optical cord using a cord pre-assembly part, in which a ferrule and an optical cord fixing member fixing said optical cord are fixed so as to be spaced apart by a predetermined spaced distance, said optical cord including a coated optical fiber having an optical fiber and an optical fiber coat covering the optical fiber, a cord outer jacket further covering the coated optical fiber and a tension resistive member disposed between said coated optical fiber and said cord outer jacket, said assembling tool comprising:

front housing holding means for holding a front housing on a front side of said ferrule of said cord pre-assembly part;

assembly holding means for holding the ferrule or the optical cord fixing member of said cord pre-assembly part;

rear housing holding means, movable in back and forth directions, for holding a rear housing, through which said optical cord of said cord pre-assembly part is inserted, and provided with a coil spring, on a rear side of said optical cord fixing member of said cord pre-assembly part;

frictional resistance applying means for applying a frictional resistance force to said optical cord on a back side of said rear housing holding means; and wherein said rear housing is coupled with said front housing in a condition accommodating said ferrule, said optical cord fixing member and said coil spring by frontward movement of said rear housing holding means.

24. An assembling tool of an optical connector plug for use upon assembling said optical connector plug with an optical cord using a cord pre-assembly part, in which a ferrule and an optical cord fixing member fixing said optical cord are fixed so as to be spaced apart by a predetermined spaced distance, said optical cord including a coated optical fiber having an optical fiber and an optical fiber coat covering the optical fiber, a cord outer jacket further covering the coated optical fiber and a tension resistive member disposed between said coated optical fiber and said cord outer jacket, said assembling tool comprising:

assembly holding means for holding the ferrule or the optical cord fixing member of said cord pre-assembly part;

rear housing holding means for holding a rear housing, through which said optical cord of said cord pre-assembly part is inserted, and provided with a coil spring, on a rear side of said optical cord fixing member of said cord pre-assembly part;

cord pulling means for pulling said optical cord on a rear side of said rear housing holding means;

front housing holding means, movable in back and forth directions, for holding a front housing on a front side of said ferrule of said cord pre-assembly part; and wherein said front housing is engaged with said rear housing in the condition accommodating said ferrule, said optical cord fixing member and said coil spring by moving said front housing holding means backward and pulling and moving said optical cord backward by said cord pulling means.

25. An optical connector plug to be connected to an end portion of an optical cord having an coated optical fiber including an optical fiber and an optical fiber coat covering said optical fiber, a cord outer jacket further covering said coated optical fiber and a tension resistive member disposed between said coated optical fiber and said cord outer jacket, said optical connector plug comprising:

- a ferrule having a flange portion and fixing an optical fiber exposed at a terminal end of said optical cord;
- an optical cord fixing member for fixing an exposed tension resistive member and said cord outer jacket of said optical cord on a rear side of said ferrule;
- a coil spring capable of insertion of said optical cord and contacting with a flange portion of said ferrule at a tip end thereof;
- a front housing having a through hole and a holding portion for holding the ferrule loaded in the through hole inside of the housing in such a manner that a tip end of said ferrule projects from a front face opening;
- a rear housing including a through hole, a spring engaging portion for engaging with a rear portion of said coil spring loaded on a front side of said through hole, and an optical cord fixing member engaging portion engaging with said optical cord fixing member to be inserted up to a rear portion of said through hole from a front side; and
- wherein said optical cord fixing member is provided with an external dimension capable of passing through inside of said coil spring and being accommodated in said rear housing;
- and said ferrule, said coil spring and said optical cord fixing member are received and secured within a space defined by engaging said front housing and said rear housing.

* * * * *